(12) United States Patent
Gabor et al.

(10) Patent No.: US 6,375,387 B1
(45) Date of Patent: Apr. 23, 2002

(54) METHOD FOR SECURING, STABILIZING AND RECOVERING AREAS OF LAND AND SUBSOIL ABOVE AND BELOW WATER

(76) Inventors: Thomas Gabor, Hermesbachstrasse 6, D-65618 Niederselters; Dieter Scharping, Husbyfelderstrasse 12, D-24975 Husby; Alfons Harke, Hermesbachstrasse 6, D-65618 Niederselters, all of (DE)

( * ) Notice: Subject to any disclaimer, the term of this patent is extended or adjusted under 35 U.S.C. 154(b) by 0 days.

(21) Appl. No.: 09/508,652
(22) PCT Filed: Sep. 11, 1998
(86) PCT No.: PCT/EP98/05761
§ 371 Date: Jun. 8, 2000
§ 102(e) Date: Jun. 8, 2000
(87) PCT Pub. No.: WO99/14440
PCT Pub. Date: Mar. 25, 1999

(30) Foreign Application Priority Data

Sep. 13, 1997 (DE) .......................... 197 40 294
Nov. 28, 1997 (DE) .......................... 197 52 794

(51) Int. Cl.$^7$ ................................. E02B 3/12
(52) U.S. Cl. ..................... 405/18; 405/16; 405/17; 405/302.6
(58) Field of Search ............ 405/15, 16, 17, 405/18, 19, 21, 22, 23, 25, 28, 29, 33, 34, 35, 302.4, 302.6, 302.7

(56) References Cited

U.S. PATENT DOCUMENTS

| | | |
|---|---|---|
| 3,842,606 A | 10/1974 | Stiles et al. |
| 4,080,793 A | 3/1978 | Pulsifer |
| 4,139,319 A | 2/1979 | Anderson |
| 4,150,909 A | 4/1979 | Hibarger et al. |
| 4,188,153 A | 2/1980 | Taylor |
| 4,196,694 A * | 4/1980 | Buchanan .................... 405/16 |
| 4,334,499 A * | 6/1982 | Baass ............................ 119/3 |
| 4,406,241 A * | 9/1983 | Comte ........................ 114/220 |
| 5,024,560 A | 6/1991 | Reilly |
| 5,056,961 A | 10/1991 | McMeans et al. |
| 5,143,484 A * | 9/1992 | Deul ........................ 405/288 |
| 5,364,206 A * | 11/1994 | Marienfeld .................. 405/16 |
| 5,370,475 A | 12/1994 | Leblanc |
| 5,370,476 A | 12/1994 | Streichenberger |
| 6,213,687 B1 * | 4/2001 | Broughton et al. ........... 405/16 |

FOREIGN PATENT DOCUMENTS

| | | |
|---|---|---|
| FR | 2643400 | 8/1990 |
| GB | 2267724 | 12/1993 |
| JP | 4-297607 | * 10/1982 |
| NL | 8800644 | 10/1989 |
| WO | 9201118 | 1/1992 |

\* cited by examiner

Primary Examiner—David Bagnell
Assistant Examiner—Frederick L. Lagman
(74) Attorney, Agent, or Firm—Martin A. Farber

(57) ABSTRACT

The aim of the invention is to provide an improved method for securing, stabilizing and recovering areas of land and subsoil above and below water. To this end, interlinked (used) motor vehicle tires (7) are used to secure the land. The necessary weighting is provided by concrete (19) injected into a protective casing (30).

43 Claims, 20 Drawing Sheets

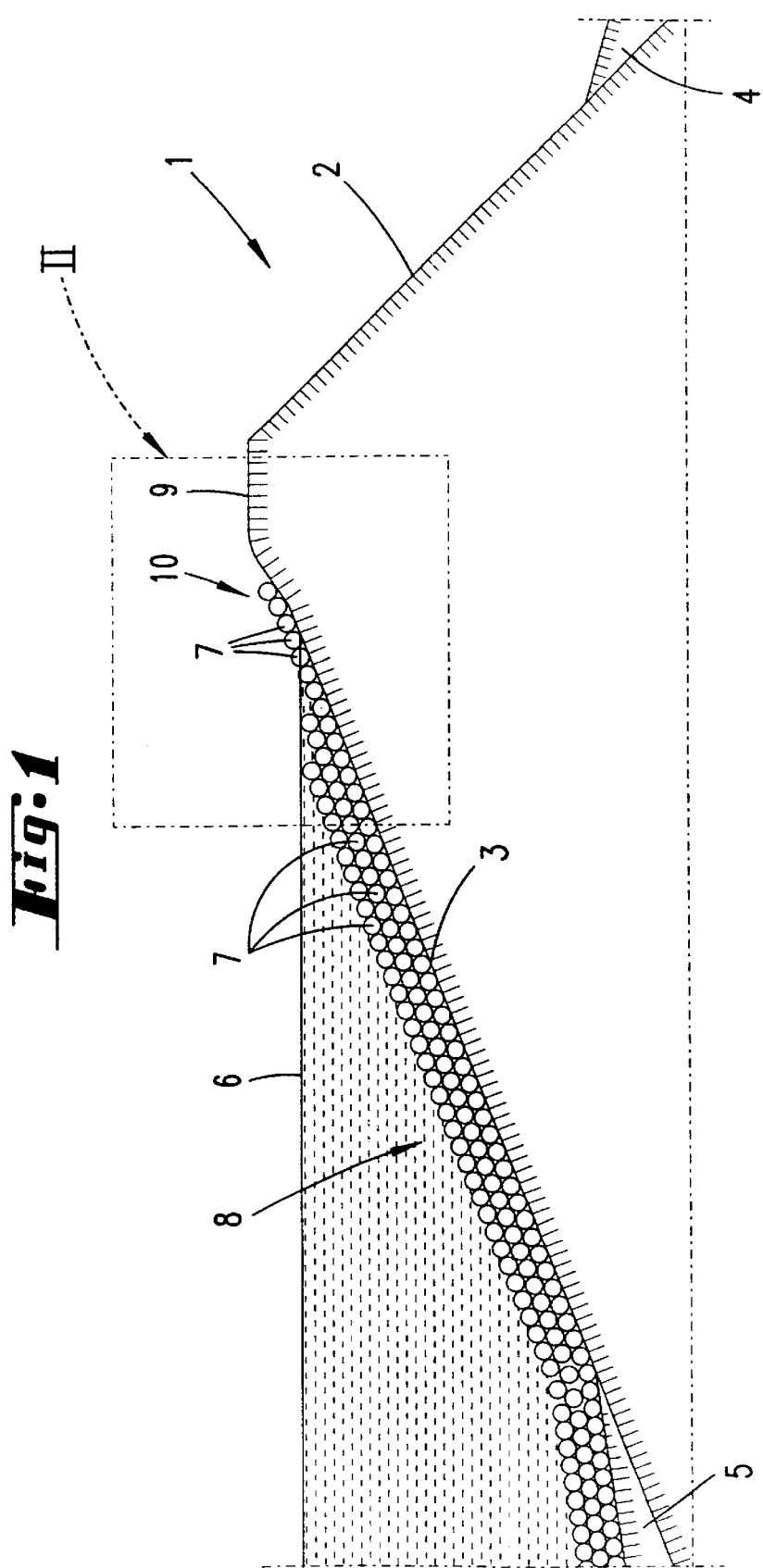

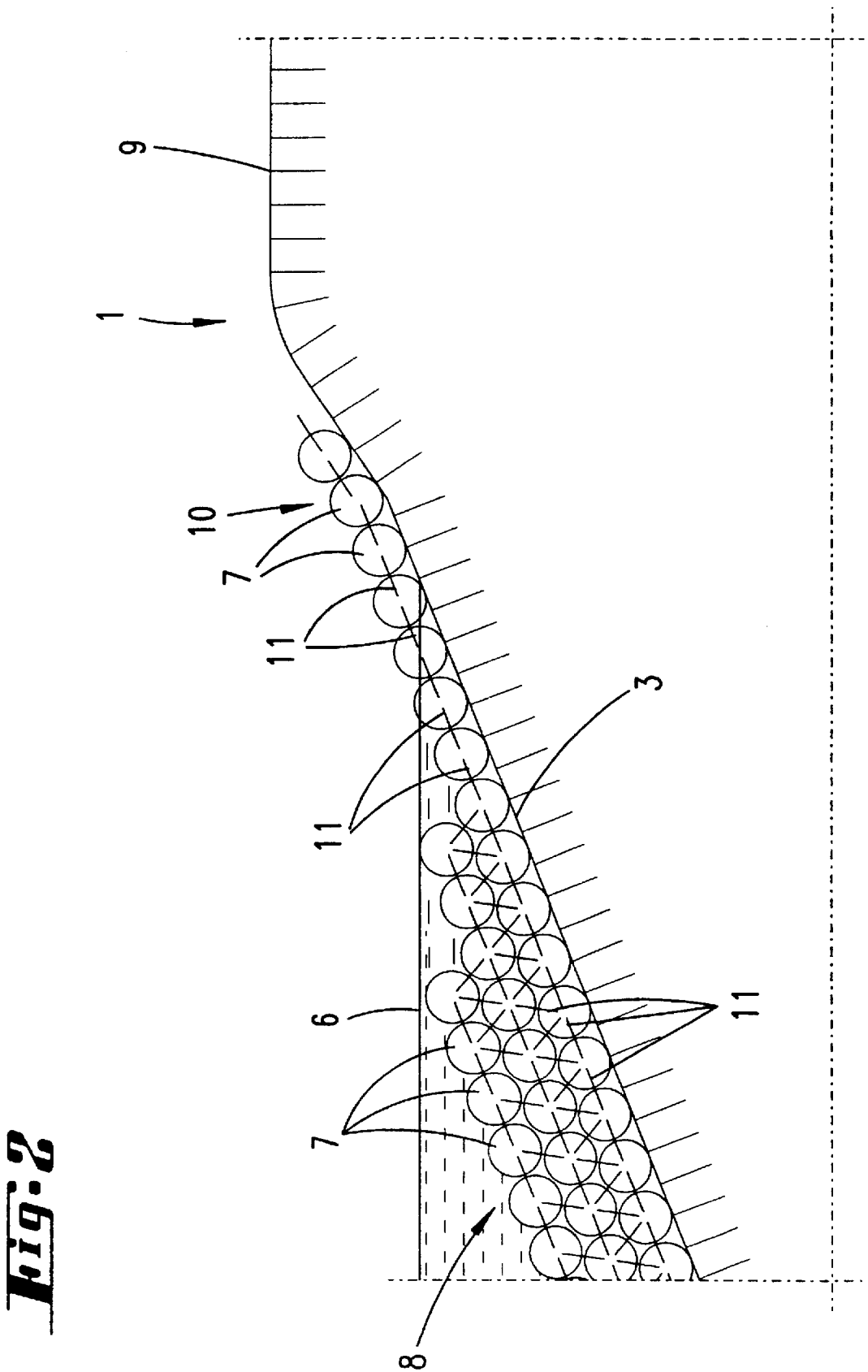

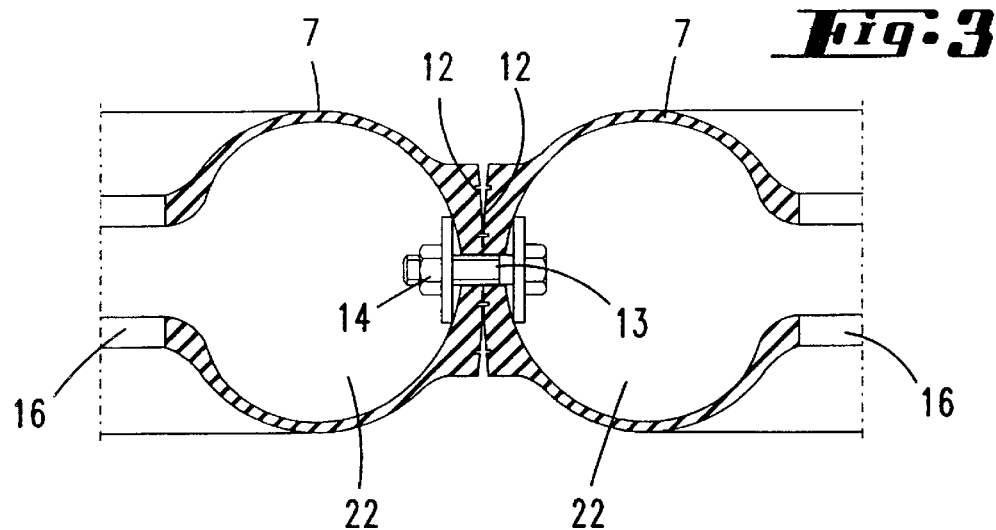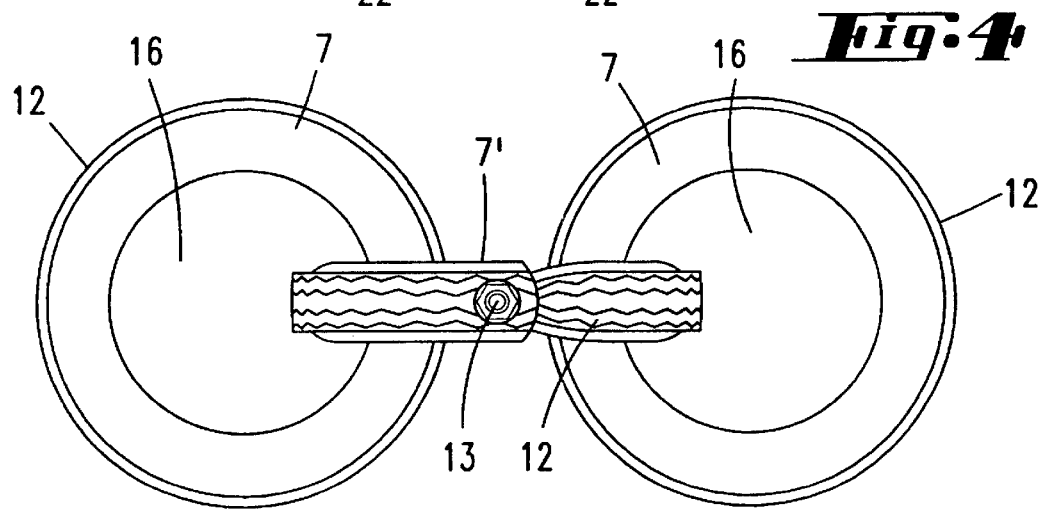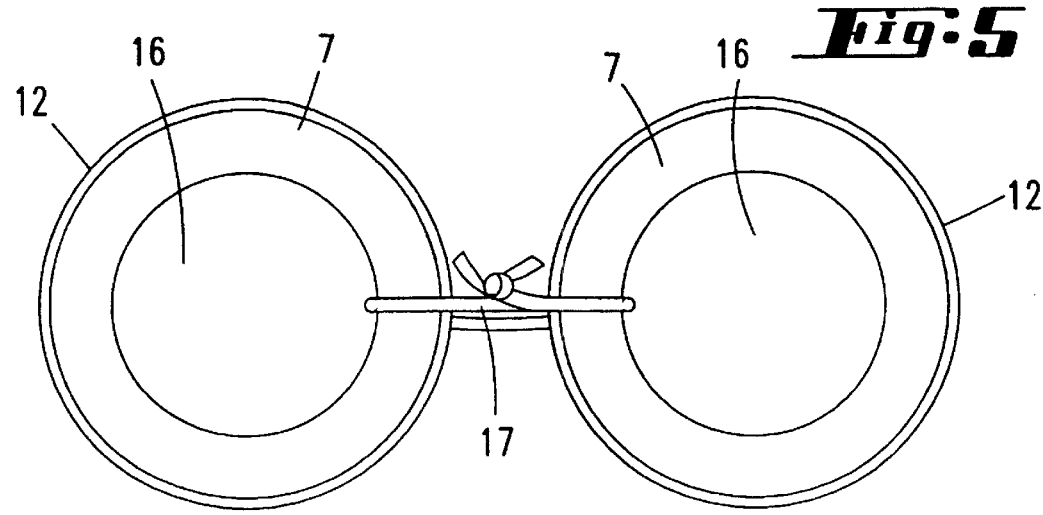

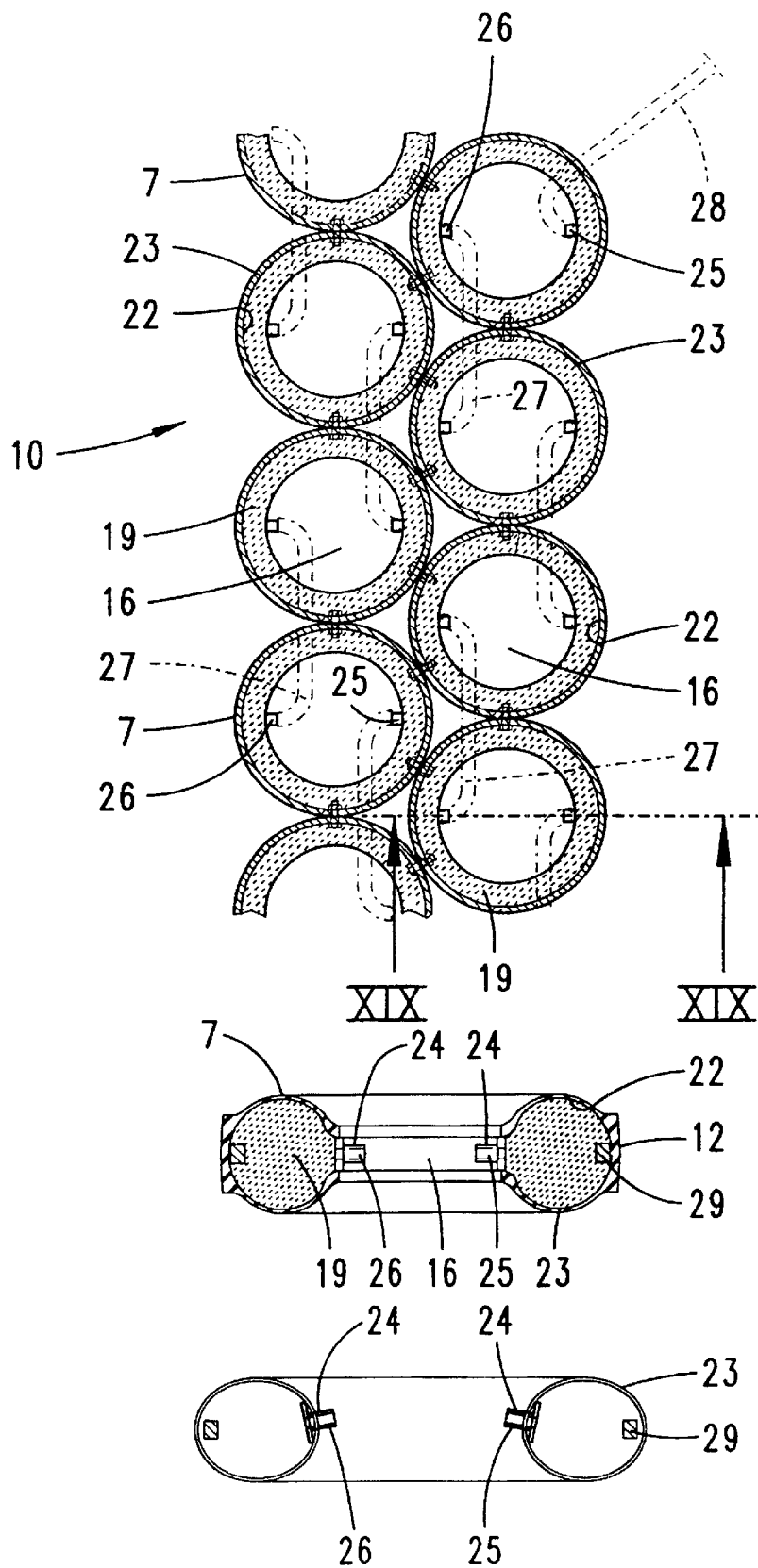

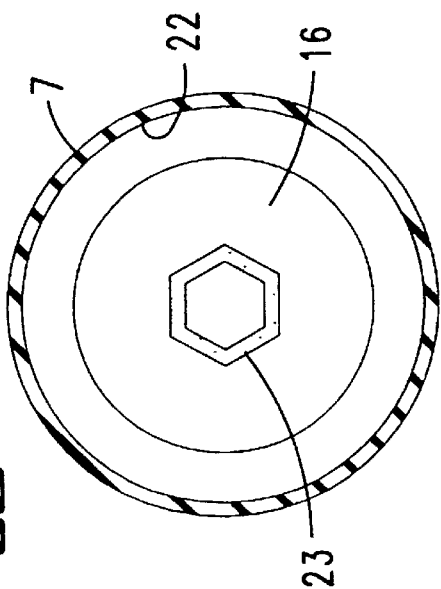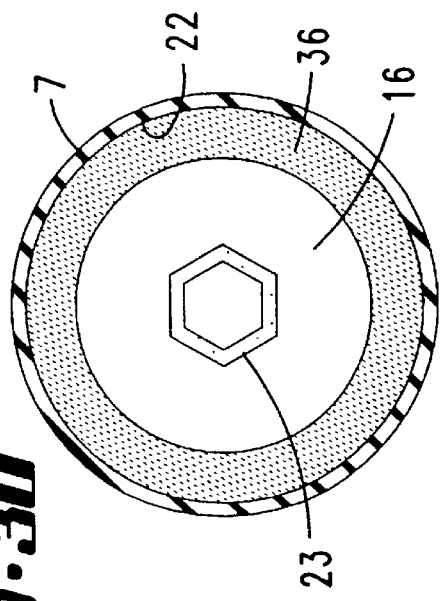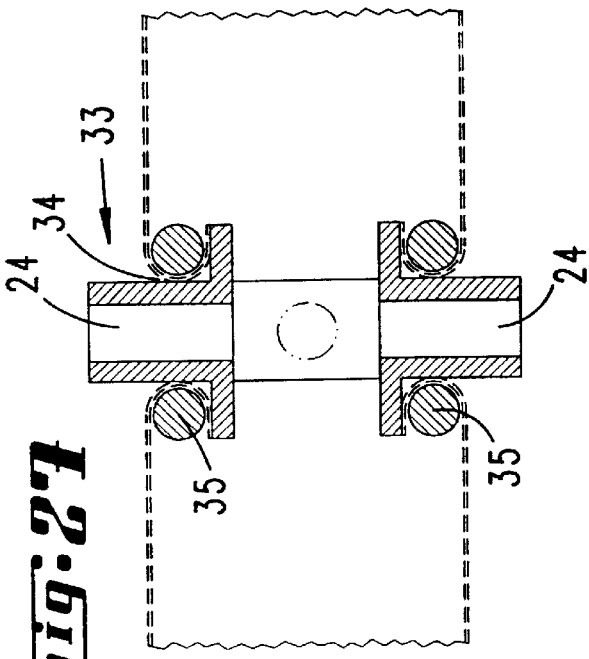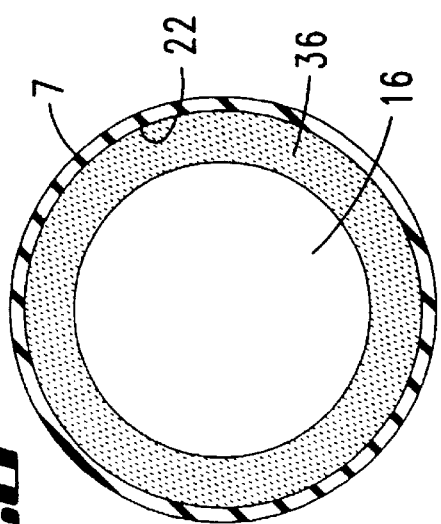

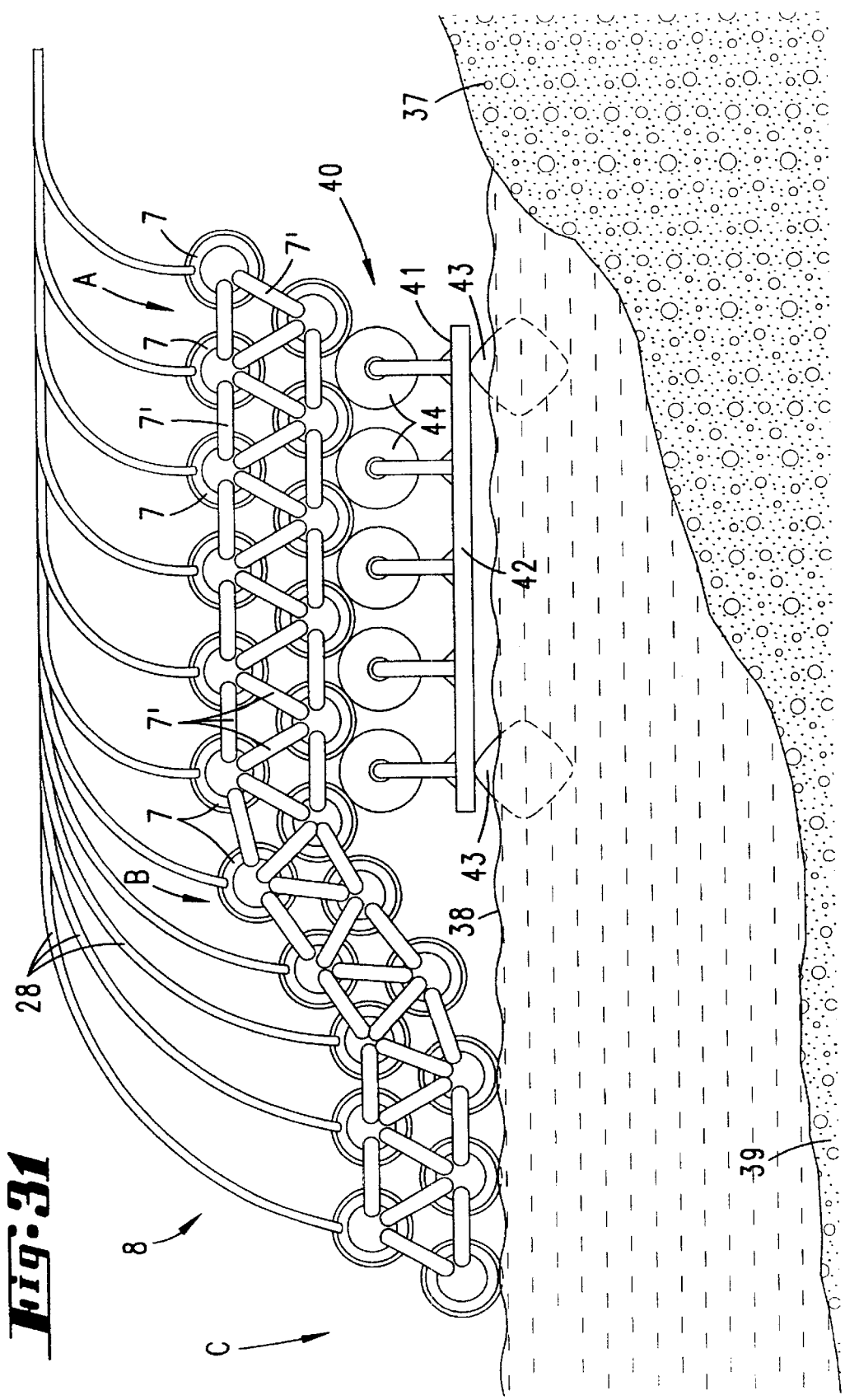

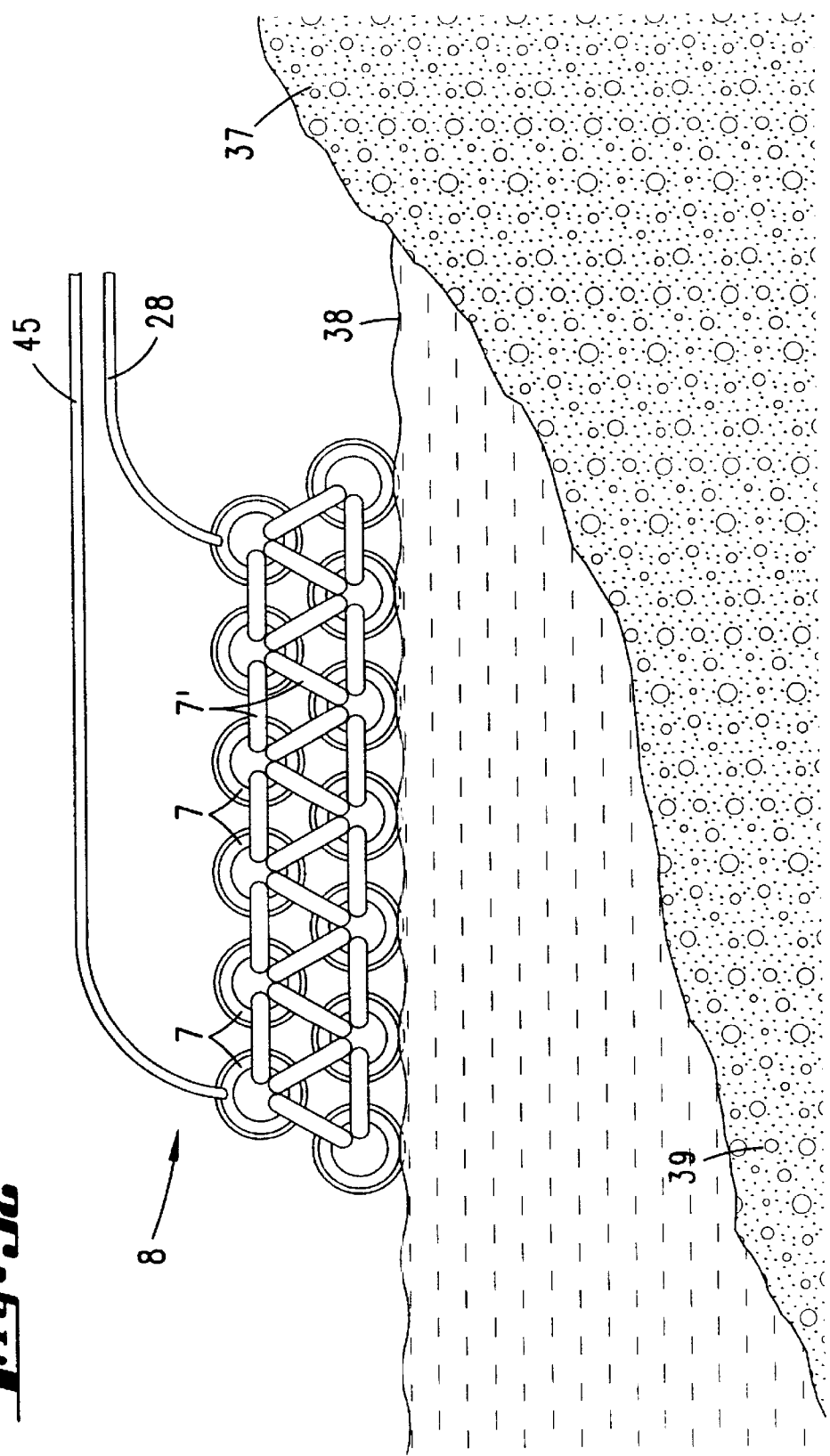

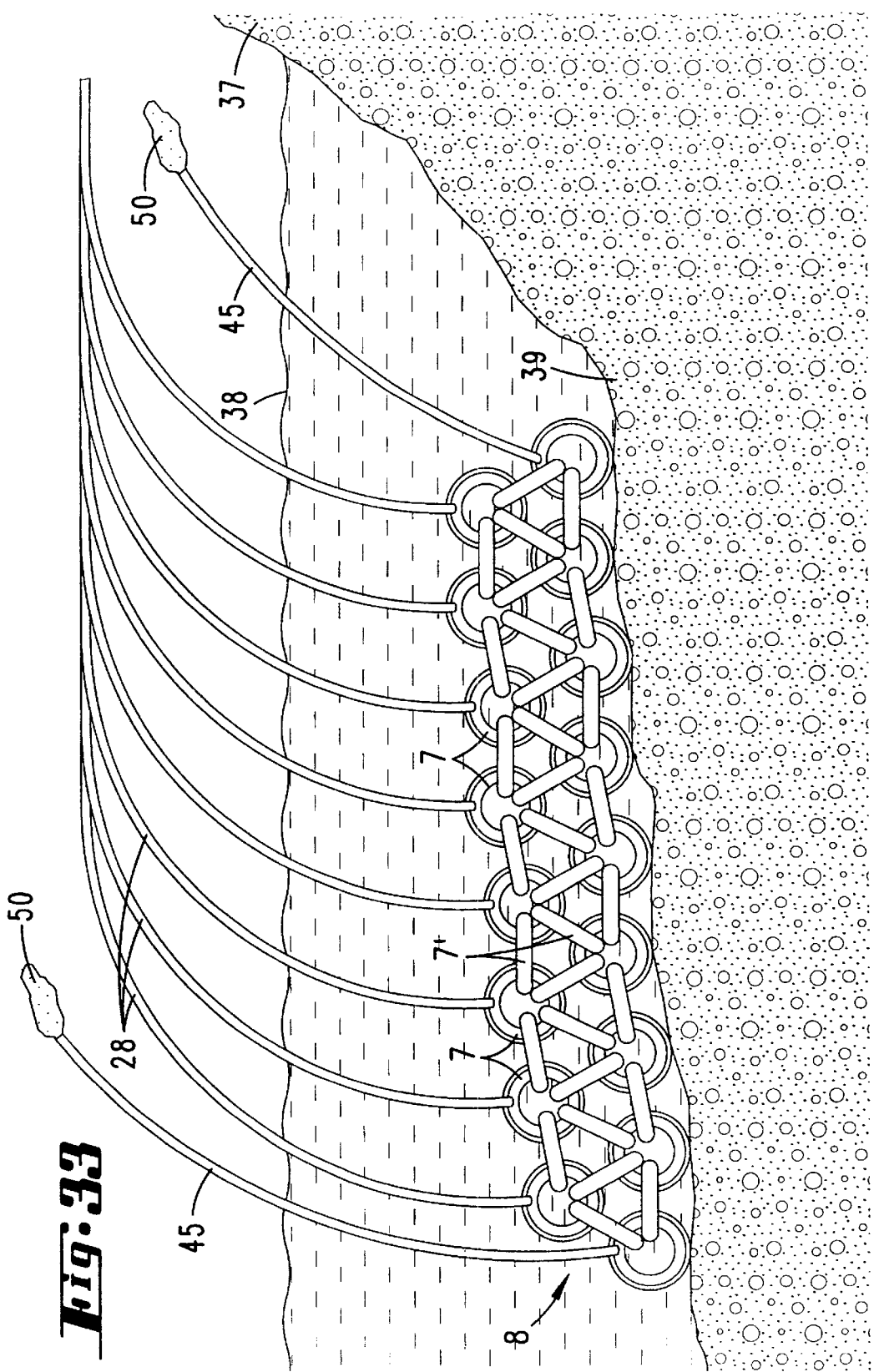

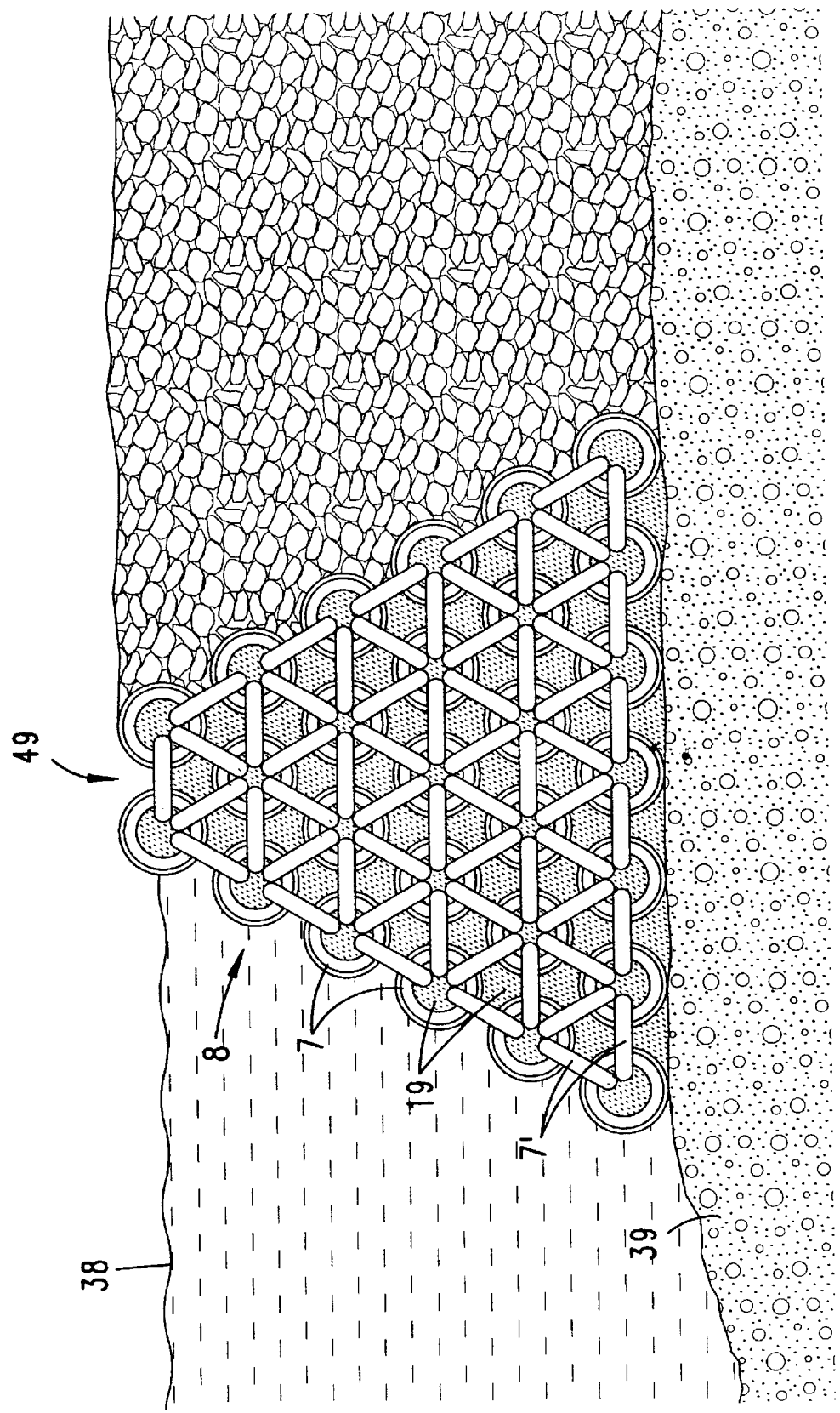

METHOD FOR SECURING, STABILIZING AND RECOVERING AREAS OF LAND AND SUBSOIL ABOVE AND BELOW WATER

FIELD AND BACKGROUND OF THE INVENTION

The invention relates, in the first place, to a method for securing, stabilising and reclaiming areas of land and subsoils above and below water.

Coastal and shoreline regions, islands, embankments, dykes, dunes and other woodland or vegetation soils laid bare, for example, due to deforestation or defoliation are exposed to high erosive forces which, sometimes irretrievably, strip away valuable subsoil. Moreover, coastal and shoreline regions, islands, embankments and dykes are subjected to high water forces, and, under certain conditions, this may lead to their destruction. Under the action of wind, dunes become so-called shifting dunes. Areas of woodland, pasture and other vegetation which are destroyed by deforestation or defoliation are exposed to irrevocable erosion. Man has always tried to combat such damage with the aid of means available to him. Thus, for example, the surface of embankments and dykes is secured with the aid of special planting schemes. Other technical means are, for example, paving with stones or covering with bitumen. Coastal regions (beaches) are secured, for example, by means of interwoven branches, so-called fascines, the ebb and flow contributing to depositing silt into areas to be protected in such manner and to reclaiming land. By contrast, areas of woodland and pasture destroyed by erosion are lost irretrievably since newly applied humus-rich soil is stripped away again as a result of new erosive forces which arise.

In the construction of artificial islands in regions of shallow water, in which dumped earth is to be secured with the aid of an enclosure of prefabricated angle supporting walls, it is repeatedly found that the latter cannot withstand the constant pressure of the dumped earth.

Even so-called tetrapods (hedgehog-shaped concrete bodies), which, by being intermeshed with one another, are intended to effect a surface structure securing of shoreline and coastal strips over an area, represent only a temporary solution to problems of erosion.

Furthermore, it is known that there are ideas of using vehicle tires, in particular old vehicle tires, for the protection of land areas, etc., these tires being filled or encased by means of concrete or other materials. The concrete used is usually so-called tipping concrete.

The measures described above for securing, stabilising and reclaiming areas of land above and below water prove either to be highly labour-intensive and cost-intensive or, because of local difficulties, to be impracticable. On the one hand, it proves difficult to provide quantities and weight of material in places where access is usually poor. Another problem is that of putting in place and putting to work the required quantities of material and local material structures in the important and critical regions under water and at relatively great depths. For this purpose, hitherto, underwater structures have had to be erected with the aid of caissons. Alternatively, materials have been introduced in bulk form inaccurately into the underwater regions to be secured.

SUMMARY OF THE INVENTION

In view of the prior art described above, in the first place a technical problem of the invention is seen in specifying an improved method for securing, stabilising and reclaiming areas of land and subsoils above and below water.

This problem is solved by the method wherein the securing is carried out by means of (old) vehicle tires interconnected in a net-like manner, weighting being accomplished by means of concrete injected in a protective sheath. The basis for the individual uses are therefore vehicle tires, preferably old vehicle tires, which are available in virtually unlimited quantity, and protective sheaths which are provided in and/or on the vehicle tires and into which concrete is injected on site. Such injecting can be carried out by remote control by way of injection hoses, and therefore, by virtue of the method according to the invention, weighting of the net structure can be achieved even in regions where access is poor. Old vehicle tires can be acquired extremely cost-effectively and, by means of different possibilities for associating them with each other and disposing them with one another, are connected to one another in a net-like manner to form bodies or sheets and, by way of the disposed and/or associated protective sheaths and injecting activities with the aid of liquid concrete or other pumpable injecting medium, become a highly loadable and at the same time flexible purpose-built structure which satisfies the respective requirements. Both vehicle tires and the injectable concrete are environmentally neutral and in no way have an adverse influence on the environmental balance. By virtue of the special injecting technique, a high-grade concrete is achieved, of which the quality, attributable to injecting by means of a protective sheath, is not diminished by, for example, components of sea water. When substrates are being introduced into the protective-sheath region of tire net structures, it is ensured that the substrate arrives, undamaged, at the target location, namely the net structure, even over long filling distances. As an alternative or in combination, it is also conceivable to use other rubber-like materials or plastics materials in the form of profiles or hollow bodies in order to produce the net structure according to the invention. The net-shaped sheet-like arrangement of old vehicle tires is used, for example, for the protection of dunes, dykes and land areas which have been eroded or are exposed to erosion. Thus, there is provision for the vehicle tires, in the first place, to be connected to one another in a net-like manner and then to be laid onto or introduced to an area of land to be secured. Particularly if the vehicle tires interconnected in a net-like manner are used for securing or stabilising dunes, there is the advantageous effect that sand swirled up by the action of wind settles in the non-preinjected tire inner spaces, thus resulting in a digging-in effect of the net structure. This effect can also be seen in use for securing dykes and shoreline and coastal regions, particularly under water. Here, due to the water flow, sand, silt and the like are deposited in the non-preinjected tire inner spaces. Furthermore, in the method according to the invention, a multilayered arrangement of vehicle tires interconnected in a net-like manner can also be carried out. There is also the possibility, while the method is being performed, of filling the vehicle tires, in each case prepared by means of a protective sheath, after they have been laid onto the area of land. Thus, for example, there may be provision for injecting the vehicle tires in a locally controlled manner with concrete, substrates or other filling media for weighting purposes and also to achieve a structure having the same nature over the entire volume. This measure serves for the purposes of weighting and of better retention on the respective land area, individual tires or a plurality of tires being injected completely or partially. The tires injected for weighting act under water in the same way as anchor or masonry structures taking effect by virtue of their weight. Injecting with concrete or other filling materials is carried out in that hoses lead from a concrete pump or a blower to permeable fabric-hoses or double surfaces embedded in the tires and liquid concrete or air-enriched substrates is introduced by way of these hoses into the hose or fabric surfaces. In this case, only the solid constituents of the pumped material remain inside the hose or fabric surface; excess water or air as means of transport pass outwards through the fabric meshes. This method can be carried out both above and below water. As an alternative to this, there may also be provision for filling the vehicle tires or the protective sheaths with earth. Thus, for the protection of, for example, land areas exposed to erosion or already eroded, the clear intermediate spaces inside and outside the vehicle tires can be filled with humus or topsoil, so as to form a base for vegetation (grass, dune grass, marram, coppices, etc.). If vegetation under water is desired (seaweed, certain algae etc.), then substrates, intermixed with the corresponding plant germs or seeds, can be injected, likewise under water, into the clear intermediate spaces, preferably by means of protective sheaths. In an advantageous development of the subject of the invention, there is provision for the net-like connection to be provided as a spatial structure of a plurality of layers of vehicle tires. If a plurality of layers of vehicle tires interconnected in a net-like manner are thus layered one above the other, the layers also being capable of being connected to one another and thereafter injected, preferably with concrete, a highly stable embankment core can thereby be formed which, because of the rubber layers of the tires, is sufficiently flexible in itself to absorb structural and subsoil movements which occur. Such tire embankments are also pre-eminently suitable where, for example in regions of shallow water, filling operations are to be carried out, for example for islands to be used for residential and vegetation purposes. The tire embankments formed by means of the method according to the invention are more cost-effective and function better than the angle supporting walls used hitherto. In the construction of atoll-like tire walls, the outer tire layers may remain non-injected, so that they can be filled with a suitable substrate for vegetation. The spatial arrangement of old vehicle tires, particularly in a case of a large-volume arrangement under water, serves, for example, for the protection of dykes or the like, such structures causing turbulences in a laminar water flow, the result of which is that, for example, sand, silt, etc. can no longer be flushed away but, instead, is arrested due to the turbulent flow and is deposited into the spatial tire structure. An effect of digging into the subsoil occurs in this case, as is known, for example, with regard to so-called concrete or steel tetrapods which serve for surface securing in the known prior art. These, however, still continue to be worked into the subsoil and ultimately no longer fulfil their purpose, since, in contrast to the tire arrangement described, they are not connected to one another. By means of the method according to the invention, turbulence-generating large-volume injected tire arrangements of virtually unlimited length and thickness can be laid against the subsoil to be protected, in the same way as a flexible and, if appropriate, impermeable coat of chain-mail. If building structures according to the invention are to be erected under water, it proves advantageous to construct the net structure on a floatable carrying device. The latter may also serve as an auxiliary structure for sliding off onto the water surface if the net structure is constructed on the shore. It is proposed, for this purpose, that the net structure be constructed continuously, with a finished section being lowered onto a water surface. It is pertinent in this case, that no complicated machines and appliances are required. The assembly and transport of the net structure are appreciably simplified by virtue of the construction according to the invention. The tire structure prefabricated on the carrying device provided as an auxiliary assembly scaffolding first slides off onto the water surface and thereafter can be brought by tugboats in the simplest possible way into the intended position and lowered there. It proves advantageous, in this regard, if the net structure is equipped with buoyancy bodies. The latter may, in the simplest form, be air-filled plastics or rubber hoses. There is provision, furthermore, for the injecting with concrete to be carried out under water after laying on a land area (for example, the ocean floor). For this purpose, it is also proposed that a connection of injecting hoses also be carried out while the net structure is being constructed. Moreover, according to the invention, any type of injecting, in particular with concrete, above and below water, can be monitored to the effect that the completion of injecting of the vehicle tires provided with the protective sheaths can be observed. It is proposed, in this regard, that a completion of injecting above and below water be monitored by way of a monitoring hose. By means of this monitoring hose connected to the net structure, the degree of filling can be indicated, particularly in the case of underwater injecting by injecting means emerging at the free end. This free end is preferably provided with a monitoring sock (fabric sock). Where injecting with concrete is concerned, the monitoring sock proves and indicates, by a hard consistency, that injecting has likewise taken place in the net structure. If the monitoring sock is still soft, the injecting hardness of the protective sheaths of the net structure is likewise soft. The monitoring socks can also be placed, above and below water, at any point on the bodies to be filled. A remote-control function is thus afforded. Injecting of the lowered net structure is therefore carried out by way of long hose lines from land or, if appropriate, from the floating carrying device or a boat. By fabric hoses being provided in the net structure, a closed-volume structure can be produced by injecting. It is thus possible to produce concrete bodies of any desired thickness which, due to the encasing or internal tires, constitute a flexibly acting reinforcement. By virtue of the controlled injecting technique, it is possible, at any desired location and in any water depth, to produce a satisfactory concrete which is not contaminated, for example, by sea water. In contrast to the known prior art, underwater works, such as, for example, the construction of new reefs and islands, can easily be carried out from the water surface by remote control. The use of injection hoses is cost-effective, since commercially available plug and connection systems can be used for this purpose. Any desired assembly platform can be erected with the aid of commercially available scaffolding-tube connections as carrying device, with underside pontoons or drums as floatation bodies. Costly and complicated traction machines for pulling the tire structure into the water from land are dispensed with. The proposed carrying device acts in the manner of a weaving loom. The tire sections assembled in each case slide onto the water surface, where they remain on the surface, by means of the buoyancy bodies mentioned, until they are lowered at the location of intended placement. When the flexible tire carpet or the three-dimensional tire structure is lowered, it adapts to the unevennesses of the ocean floor. Only after injection, for example with concrete, does the structure acquire its strengths as though it were cast in place on the ocean floor. In the method according to the invention, costly submersion works are required merely for checking purposes and individual assembly purposes.

The invention relates, furthermore, to a dyke, such as a sea dyke or river dyke, with an outer slope and an inner slope. Here, for stabilising and securing the dyke, it is proposed that the outer slope and/or the inner slope be secured by means of injected vehicle tires which lie on them and which are connected to one another to form a net structure. There are many reasons why damage to the dyke body occurs. First and foremost is the damage caused by the force of the water (flow, waves, surf, ice). This includes, inter alia, holes knocked into the dyke slopes by the surf. Moreover, there are atmospheric phenomena (precipitations, frost, drought) which cause the dyke soil to be washed away, damage to the turf and shrinkage cracks in the dyke body. Furthermore, man also puts the dyke at risk by carelessness, thus, for example, by travelling over the dyke on surfaces not intended for this purpose or else by forming footpaths or the like. It is known to ward off, weaken or render harmless by structural measures water forces which come into action. A distinction is made, here, between active (natural) dyke protection and passive (artificial) dyke protection. In passive dyke protection, the attacking forces are absorbed by protective works (shoreline fortifications consisting of shrubbery, stones or bitumen, groynes, training embankments etc.) lying directly along the dyke line or additionally by securing works (fencing works, dyke walls) on the dyke body itself. These known measures prove mostly either to be either highly labour-intensive and cost-intensive or to be unsuccessful. The arrangement according to the invention of vehicle tires, in particular old vehicle tires, connected to form a net structure and injected, for example, with concrete, on the slope of the dyke affords dyke protection in the simplest possible way and extremely cost-effectively. An arrangement in which the net structure is multi-layered is preferred in this case. As a result of this construction, turbulences are caused in a laminar water flow which accretes to the dyke soil in unprotected form. The result of this is that sand, silt, etc. cannot be flushed away. Instead, the advantageous effect is obtained whereby sand, silt, etc. is deposited into the spatial tire structure. A construction in which the net structure tapers in a stepped manner towards the dyke top is preferred. Thus, for example below a maximum water level, a three-layer or multi-layer arrangement of vehicle tire net structures may be provided, and these layers may also be connected to one another. Above the maximum water level, the net structure is merely of single-layer form, and, in this region, it is possible, for example, for the vehicle tires and the free spaces formed between them to be filled with topsoil injected in fabric hoses. Moreover, it proves advantageous if the net structure extends over and beyond the slope into the land in front. Thus, for example, there is provision, on the water side of a sea dyke, for the net structure to secure both the outer slope and the outer berm preceding the latter. For the purposes of weighting and of better retention on these areas, it is preferred to inject individual tires with concrete or other filling material completely and also together with one another by way of fabric hoses. On the inside, too, the dyke may be protected against erosion and mechanical stress by means of, for example, a single-layer net structure of vehicle tires, in which case, here too, the net structure can extend beyond the inner slope over the inner berm.

The invention relates, furthermore, to a net structure of vehicle tires, in particular for use in the method or for forming a dyke wherein, in order to improve such a net structure, it is proposed that the net structure be weighted by means of concrete injected in a protective sheath. By virtue of the construction according to the invention, the injection with concrete is carried out in a highly controlled manner and preferably by remote control, in that the filling of the protective sheaths takes place by way of attached connecting hoses which, if appropriate bundled together, are linked with a compressor or the like on the far side of the concreting location. It proves advantageous, at the same time, for the protective sheath to be a hose which is inserted, for example, into the tire interior. Particularly when the net structure according to the invention is erected under water, there is provision for the protective sheath to be water-impermeable, with the result that the injected concrete or another injected material is not contaminated, for example, by sea water. As an alternative or in combination, there may also be provision for the concrete element injected in the protective sheath to pass through the vehicle tire in the axial direction. A sock, in particular a fabric sock, is preferably used for this purpose. It proves to be a particular advantage, in this regard, if the concrete elements are brought by injection into a non-positive and/or positive bond with the vehicle tires. Such a net structure according to the invention, in particular comprising old vehicle tires, may be used for securing, stabilising and reclaiming different land areas and subsoils, both above and below water. It is also proposed, in this respect, that two vehicle tires be bolted to one another by penetration through the treads. Thus, the old vehicle tires lying with their treads against one another can be connected to one another in the simplest possible way, for example by means of screwing, for example in order to achieve a chain of a plurality of even completely different old vehicle tires. Alternatively, the connection may be selected in such a way that two vehicle tires are connected to one another by means of a loop, such as a wire loop. Connections by means of chains, wire or other clamping members may also be envisaged. These connection possibilities serve, in particular, for forming a sheet-like net structure. As an alternative or else in combination, there may be provision for one vehicle tire to connect two further vehicle tires to one another in a loop-like manner. In this case, all the tires are connected to one another, as desired, in the manner of a structure composed of chain links, with the result that a spatial arrangement of vehicle tires is achieved. Such a spatial arrangement is also possible through connection by means of a loop or by bolting together. The advantage of such a spatial arrangement is the generous spatial volume thus achieved and in the better moveability in relation to the subsoil. The net structure thus formed has an improved adaptability. There is advantageously provision for the connecting vehicle tire or the connected vehicle tires to be severed and reconnected to one another. There is also provision, in this respect, for the severed vehicle tires to have a substantially radially directed severing cut and to be reconnected to one another so as to overlap at the severing point. In a preferred construction, this connection is made by bolting together. However, other possibilities for reconnecting the severed vehicle tire may also be envisaged, thus, for example, by vulcanisation. In a further construction of the subject of the invention, there is provision for connecting one vehicle tire to at least two further vehicle tires. A construction is preferred in which one vehicle tire is filled with a filling mass, the filling mass being preferably concrete for weighting the net structure or for forming an anchor. The concrete can be injected both above and below water. It is also conceivable, in this respect, for the concrete to fill the tire inner space, that is to say so as to leave the tire opening free. Alternatively, there may also be provision for the concrete to fill the vehicle tire completely, including the free tire opening. The concrete to be injected can be pressed directly into the clear intermediate spaces inside and also outside the tires. A construction is preferred, however, in which a fabric hose injected with concrete is accommodated in the tire inner space. Thus, the concrete can be conducted from a concrete pump by way of hoses to the permeable fabric hoses or else double surfaces embedded in the tires. At the same time, only the solid constituents of the pumped material remain in the fabric hose, the excess water passing outwards through the fabric meshes. This type of concrete injection is also suitable for the complete filling of the vehicle tire, in which case a fabric hose filling the entire tire diameter and injected with concrete is accommodated in the vehicle tire. It is also preferred, in this respect, that a fabric hose have a filling connection. The hose connected to the concrete pump is attached to the filling connection. In order, in a net structure of a multiplicity of vehicle tires, to avoid having to operate each individual fabric hose for filling with concrete, there is advantageously provision for a fabric hose to have two filling connections as inlet and outlet connections. Furthermore, more than two filling connections are also conceivable. Thus, the individual fabric hoses may, for filling purposes, be connected in a row or in series by hose-like or tube-like connection pieces which are in each case connected at one end to an outlet connection of a first fabric hose and at the other end to an inlet connection of the next fabric hose. There is also the possibility of attaching a monitoring hose to a filling connection. The latter serves for monitoring the state of injection of the net structure, irrespective of whether injection takes place above or below water. A construction is preferred, in this regard, in which a monitoring sock injected with concrete is provided on the hose. The monitoring sock serves, in this case, as an indicator of the state of injection, particularly during the injection of net structures which cannot be seen or cannot be seen easily, such as during injection under water. Furthermore, the hardened-out monitoring sock can also be filed away and used for subsequent analytical purposes. In order to offer concrete injection over the full area of the entire network, it is expedient for wedge-shaped regions arising when vehicle tires are laid against one another flat to be filled with concrete. In this case, it is also conceivable for the wedge-shaped regions to be injected with concrete through a fabric hose having a filling connection. For this purpose, the fabric hose may also have two filling connections as inlet and outlet connections, in order to connect these to the fabric hoses in the vehicle tires The filling connections mentioned may be provided in the form of known injection nipples, in which one nipple serves for the supply of injection mass and the other nipple conveys the injection mass further on to other fabric-hose bodies. The latter are advantageously modified in such a way that provided in the fabric hose is a spreading ring which can consist of any desired material having a diameter approximately equal to the inside diameter of a tire and which serves for prefixing the fabric hose in the vehicle tire. Alternatively to the concrete filling mass, it may also be envisaged to fill the clear intermediate spaces inside and outside the vehicle tires with humus or topsoil, this being a basis for vegetation. If vegetation under water is desired, there may be provision for the filling mass to be a substrate intermixed with plant germs and/or plant seeds. These may likewise be injected under water. According to the invention, the arrangements of the individual vehicle tires with and in relation to one another are such that, in principle, these can be connected as follows. First by direct bolting together in each case of two tire surfaces which are in relation to one another. Further, by loose connection of tires with the aid of chain or wire loops or those made of other suitable materials, such as ropes, etc. It is also possible, moreover, to connect tires by means of a tire previously cut open and subsequently joined together again to form a closed ring, the latter tire being bolted in a simple way. In the arrangement of the tires in relation to one another, sheet-like or else spatial structures are possible, thus, for example, sheet-like, even multi-layer layers, arranged parallel to one another, which may be injected over their partial or else entire area. Furthermore, also spatial structures of any desired thickness and length which may be injected or else left open.

The invention relates, furthermore, to an assembly platform for erecting a tire net structure on water. The assembly platform according to the invention is distinguished by rolling members which are arranged with their axes of rotation transverse to a longitudinal extent of the net structure and by way of which net-structure sections put together on the assembly platform can slide off onto the water surface in the simplest possible way. Alternatively, the assembly of the net structure may be carried out in the shoreline region, after which the assembly platform serves merely as a run-out aid. It is also proposed, in this respect, that the rolling members form a working base surface for the assembly platform. There is provision, moreover, for the assembly platform to have on its underside floatation elements, such as, for example, pontoons or drums. As regards the rolling members, there is provision for these to be formed from (old) vehicle tires. It is, however, also possible, for example, for used steel barrel hoops to be employed. The assembly platform may, furthermore, consist of commercially available scaffolding tubes with scaffolding-tube connectors.

The method according to the invention and also the dyke according to the invention, the net structure according to the invention and the assembly platform according to the invention prove to be extremely cost-effective, since the basic materials, such as old vehicle tires, incur virtually no costs for the user. In practice, there is usually even a situation where the person disposing of the old tire also has to pay for giving away the old tire, that is to say the recipient, hence, in the present case, for example, the user of the method, is even paid for accepting the old tires Tremendous benefits are also afforded in economic terms. Jobs can be created within the framework of the use according to the invention. The synergy effect is enormous, and its positive development still cannot be foreseen.

BRIEF DESCRIPTION OF DESCRIPTION OF THE DRAWINGS

The invention is explained in more detail below with reference to the accompanying figures of the drawings which illustrate merely several exemplary embodiments and in which:

FIG. 1 shows a diagrammatic cross-sectional illustration through a sea dyke with a net structure of vehicle tires which is provided on the outer slope;

FIG. 2 shows an enlargement of a detail corresponding to the region II in FIG. 1;

FIG. 3 shows a cross-sectional illustration through a connecting region between two vehicle tires, these being connected to one another by being bolted together;

FIG. 4 shows a tire arrangement, in which a vehicle tire connects two others to one another in a loop-like manner;

FIG. 5 shows a tire arrangement, in which the connection of two vehicle tires is made by means of a loop;

FIG. 18 shows a sectional illustration corresponding to that of FIG. 16, but, here, only the tire inner spaces are filled by means of inserted fabric hoses;

FIG. 19 shows, in enlarged illustration, the section along the line XIX—XIX in FIG. 18;

FIG. 20 shows a fabric hose in cross section;

FIG. 27 shows a cross section through a fabric hose to be injected;

FIG. 28 shows, in section, a vehicle tire with an inner plastics or rubber hose as a buoyancy body;

FIG. 29 shows the vehicle tire with an inner fabric hose for injection;

FIG. 30 shows the vehicle tire with buoyancy body and fabric hose;

FIG. 31 shows a diagrammatic illustration of the production of a net structure according to the invention on a floating carrying support;

FIG. 32 shows the finished net structure floating on the water, referring to a net structure embodiment alternative to that of FIG. 31;

FIG. 33 shows the net structure lowered onto the ocean floor;

FIG. 35 shows a diagrammatic sectional illustration of a circular rampart constructed by means of the net structure according to the invention.

DETAILED DESCRIPTION OF THE PREFERRED EMBODIMENT

Figure 6:
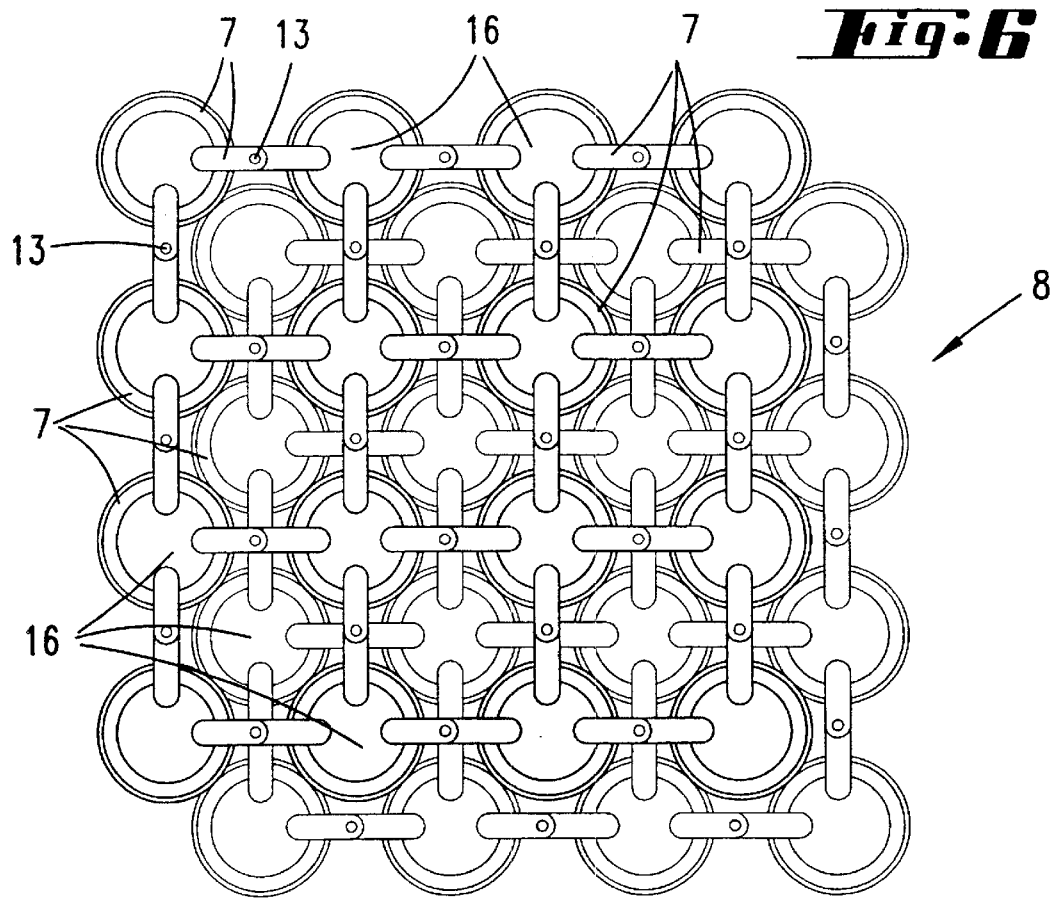
FIG. 6 shows a top view of a spatial net structure of vehicle tires, with a selected connection according to FIG. 4.

Referring to FIG. 1, first a dyke 1, illustrated in cross section, here a sea dyke, is illustrated, with an inner slope 2 and an outer-slope 3 and also, added on, an inner berm 4 and an outer berm 5. The critical storm-tide water level is indicated by the reference numeral 6.

In order to secure and stabilise the dyke 1, in particular its sea side, in the exemplary embodiment shown, three layers of old vehicle tires 7 interconnected in a net-like manner and injected are laid on the outer slope 3. These three layers are, in turn, connected to one another in a net-like manner, so that there is provided a spatial structure for producing dyke protection. Furthermore, this spatial net structure 8 extends beyond the outer slope 3 into the outer berm 5 and, if appropriate, into the land in front of the dyke.

The net structure 8 tapers in a stepped manner towards the dyke top 9, so as to form a single-layer sheet-like net structure 10. Thus, FIGS. 1 and 2 illustrate a tire arrangement which is formed partly in a sheet-like manner and partly in a spatial manner, consequently, according to the invention, illustrating a situation above and below water. The transition from the spatial net structure 8 to the sheet-like net structure 10 takes place in the region of the critical storm-tide water level 6.

As a result of the sheet-like net structure 10 above the water level 6, surface protection is achieved, it being possible for the vehicle tires 7 secured together to form the net structure 10 to be, for example, bolted to one another. In the region of the spatial net structure 8, the individual layers are also connected to one another in preferably the same way. Such a structure causes turbulences in a water flow flowing in a laminar manner, with the result that, for example, sand, silt, etc. cannot be flushed away, but, instead, is arrested and deposited into the spatial tire structure as a result of the turbulent flow. There is, at the same time, a desired effect of digging into the subsoil.

The vehicle tires 7 above the water level 6, which form a sheet-like net structure 10, may selectively be, for example, injected with concrete or else non-injected. As regards the spatial net structure 8 below the water level 6, the vehicle tires 7 may be partially injected, non-injected or else fully injected.

The connecting elements 11 connecting the vehicle tires 7 to one another are illustrated merely diagrammatically in FIG. 2. Various embodiments of these connections are described in more detail below.

In FIG. 3, two vehicle tires 7 are press-bolted to one another with penetration through their treads 12, for which purpose a bolt 13 passing through the treads 12 is locked by means of a nut 14. Substantially rigid net structure is thereby afforded.

Figure 10:
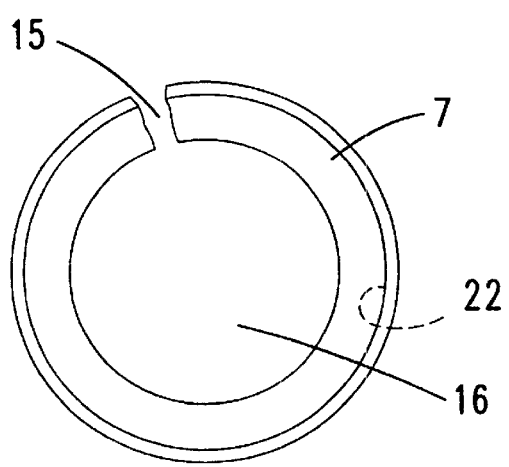
FIG. 10 shows, in a front view, a severed vehicle tire.
Figure 11:
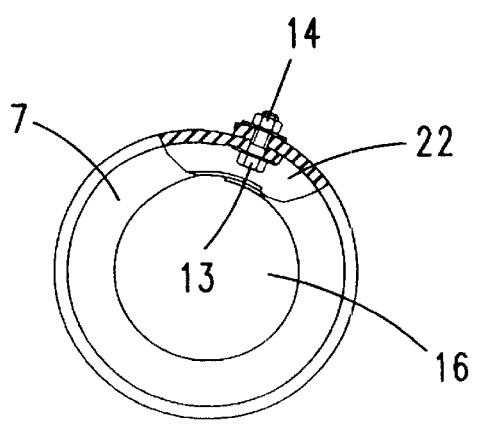
FIG. 11 shows the vehicle tire according to FIG. 10 partly in section, the vehicle tire being closed again annularly, so as to overlap at the severing point.

FIG. 4 illustrates an alternative form of connection, in which a vehicle tire 7' connects two further vehicle tires 7 to one another in a loop-like manner. For this purpose, the connecting vehicle tire 7' is severed in such a way that it has a substantially radially directed severing cut 15 (cf. FIG. 10). After the tire 7' cut open in this way has been passed through the tire openings 16 of the tires 7 to be connected, the two free ends are connected to one another again so as to overlap in the region of the severing point, bolting together, of the type described with regard to FIG. 3, preferably being used here (cf. FIG. 11).

As a result of this form of connection, the vehicle tires 7 and 7' are connected to one another, as desired, in the manner of a structure consisting of moveable chain links.

As a further alternative, a moveable connection of the vehicle tires to one another may also be made by means of a loop, such as a wire loop 17 according to FIG. 5. In this respect, a connection by means of chain, wire or other clamping members may also be envisaged.

Figure 7:
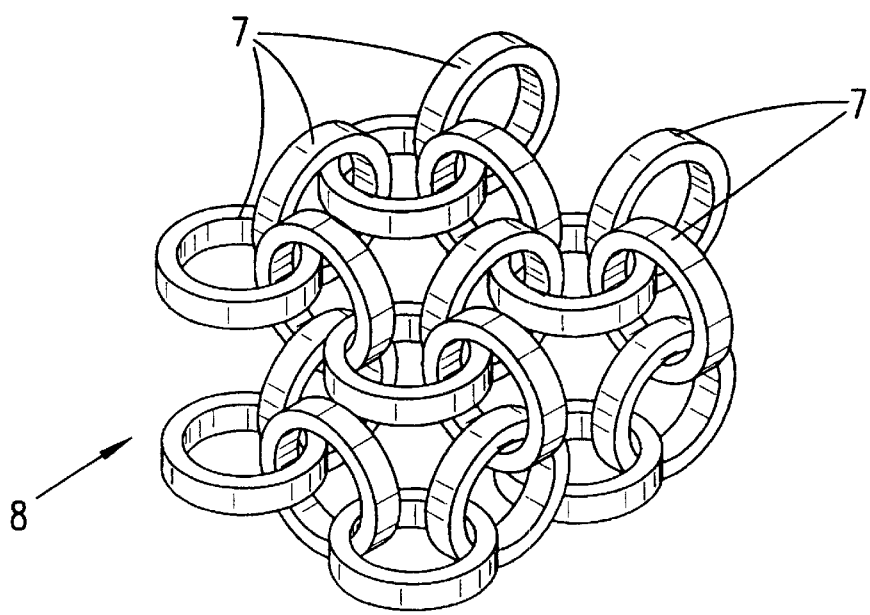
FIG. 7 shows a diagrammatic perspective illustration of the spatial net structure according to FIG. 6.

In FIGS. 6 and 7, there is illustrated a spatial arrangement of tires 7 for forming a spatial net structure 8. Preferably, in this case, the individual tires 7 are connected to and in relation to one another by means of tire connections in the way described with reference to FIG. 4. Such spatial net structures 8 obtained by connecting the vehicle tires 7 to one another according to the forms of connection described with reference to FIGS. 3 and 5 may also be envisaged. The advantage of the spatial net structure 8 is the more generous spatial volume thus achieved and its better moveability in relation to the subsoil, that is to say improved adaptability. It is possible, for example, for the spatial net structure 8 illustrated below the water level 6 in FIG. 1 to be formed in the manner illustrated in FIGS. 6 and 7.

Figure 8:
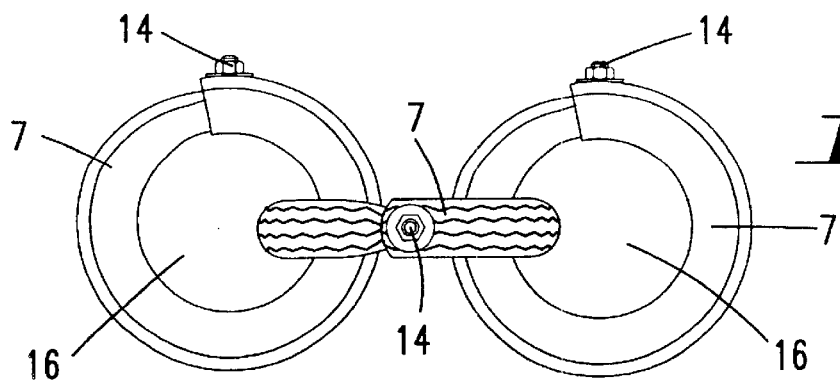
FIG. 8 shows, in a front view, a further connecting arrangement of vehicle tires.
Figure 9:
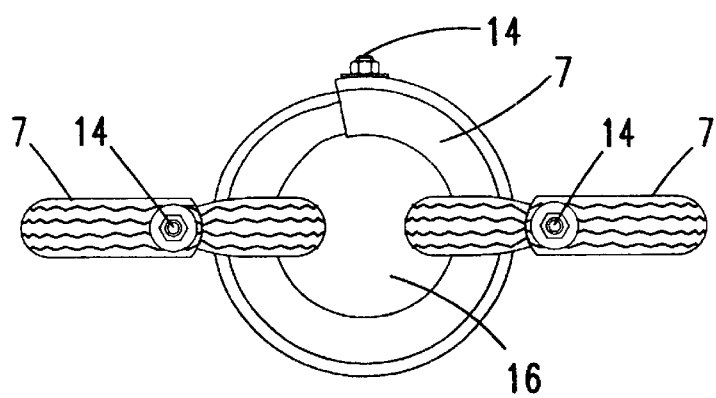
FIG. 9 shows the top view of FIG. 8.

FIGS. 8 and 9 show a further embodiment of a link-chain-like arrangement of vehicle tires 7 which is similar to the arrangement according to FIG. 4. Here, however, all the vehicle tires 7 are severed and, after the loop-like connection has been made, are bolted together again to form a tire-like structure.

Figure 12:
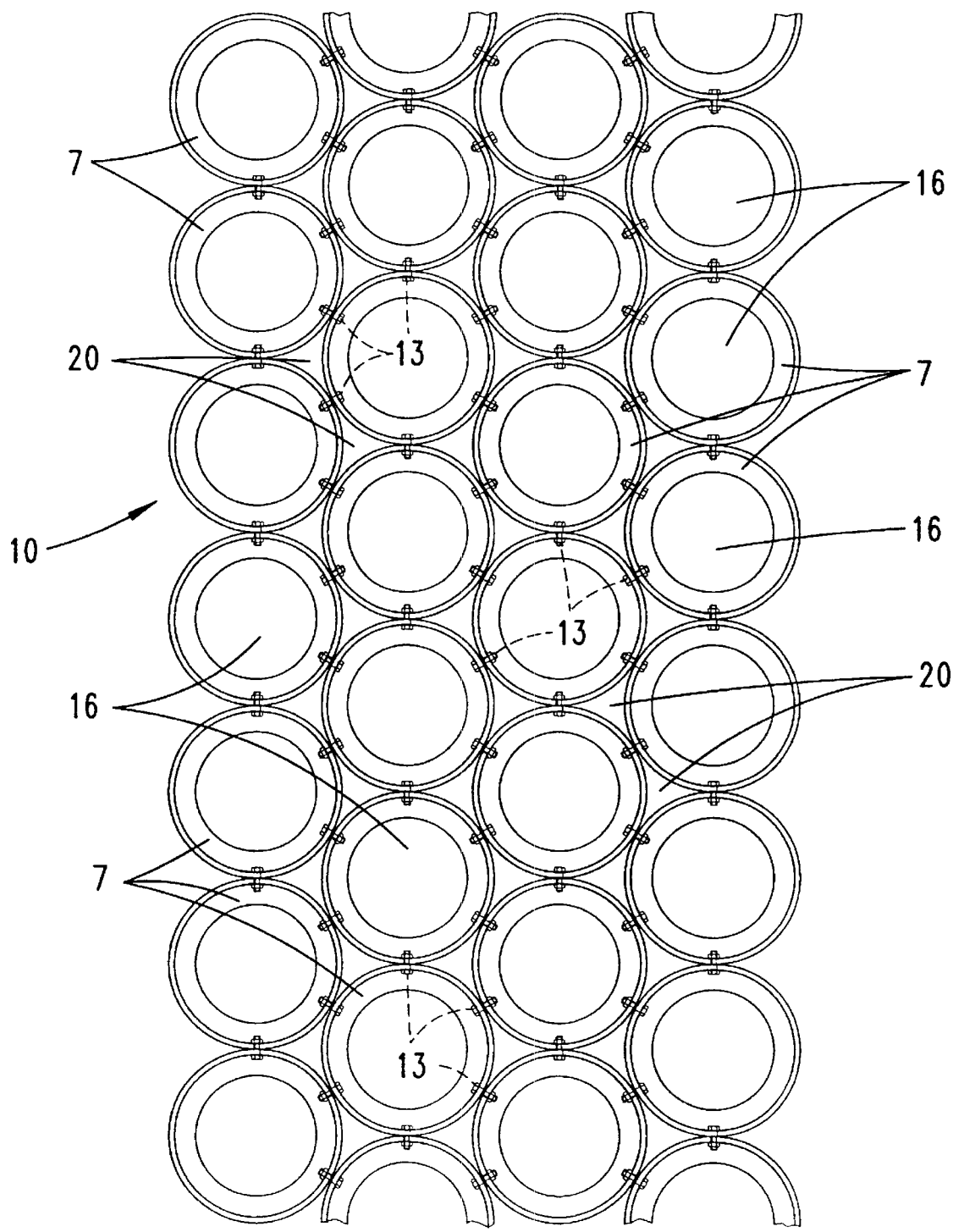
FIG. 12 shows a sheet-like arrangement of old vehicle tires which are bolted to one another via their treads.

An exemplary sheet-like net structure 10 produced from old vehicle tires 7 is illustrated in FIG. 12. Here, each vehicle tire 7 is connected to at least two further vehicle tires 7. In the exemplary embodiment shown, the tires 7 are bolted to one another according to the embodiment illustrated in FIG. 3. This arrangement results, particularly when injection with concrete is carried out after this net structure has been laid onto a land area to be secured, in a strong and flexible sheet-like structure which is capable of limited stretching.

Figure 13:
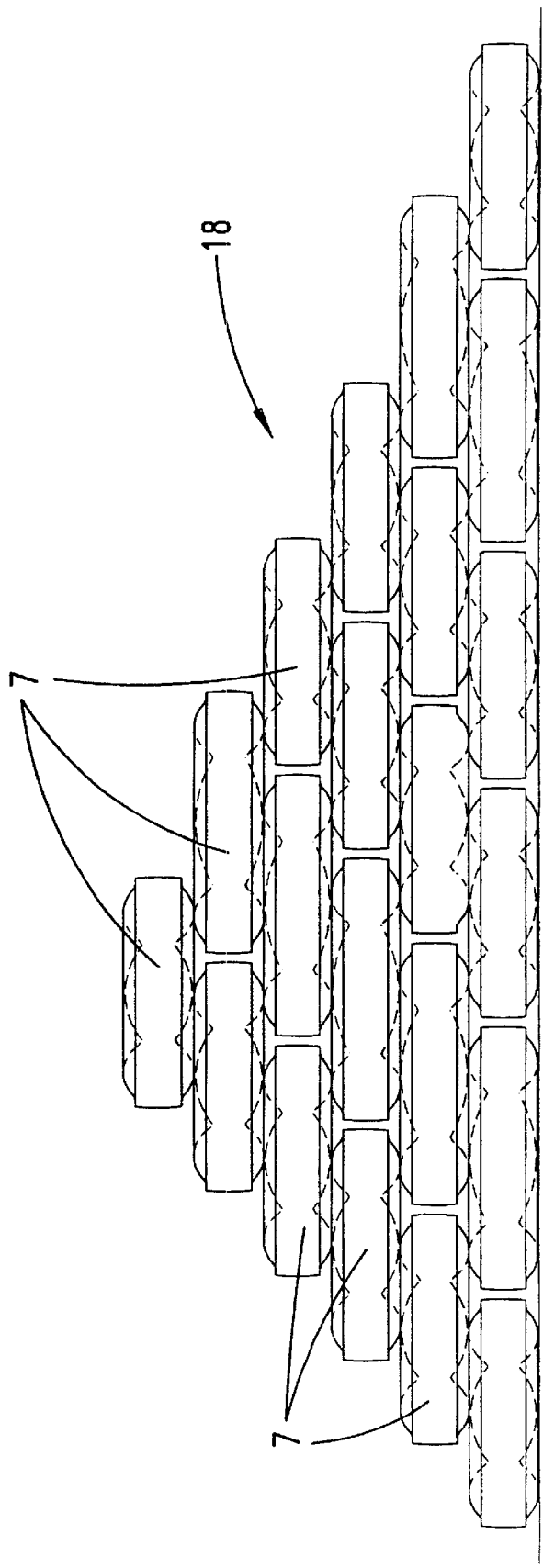
FIG. 13 shows an embankment formed from net structures layered one above the other.

FIG. 13 illustrates a further application. Here, vehicle tires 7 are layered one above the other to form an embankment core 18. Such an embankment core 18 is preferably injected with concrete. A highly stable embankment core 18 is thereby formed, which, as a result of the rubber layers of the vehicle tires 7, is sufficiently flexible in itself to accompany or absorb structural and subsoil movements which occur. Such tire embankments are also pre-eminently suitable where, for example in regions of shallow water, dumpings are to be carried out, for example for islands for residential and vegetation purposes. In the construction of atoll-like tire walls, the outer tire layers may remain non-injected, so that they can be filled with a suitable substrate for vegetation.

Figure 14:
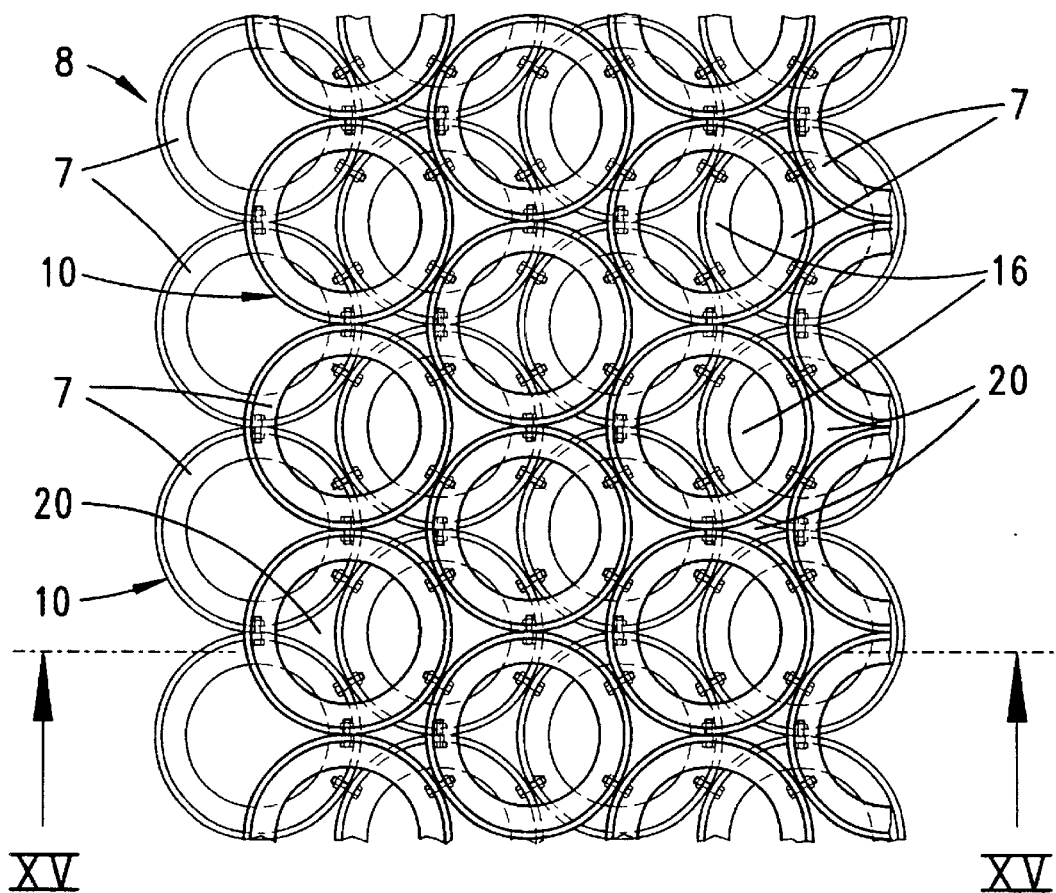
FIG. 14 shows a top view of a net structure arrangement in which vertical layers are mounted, offset, one above the other.
Figure 15:
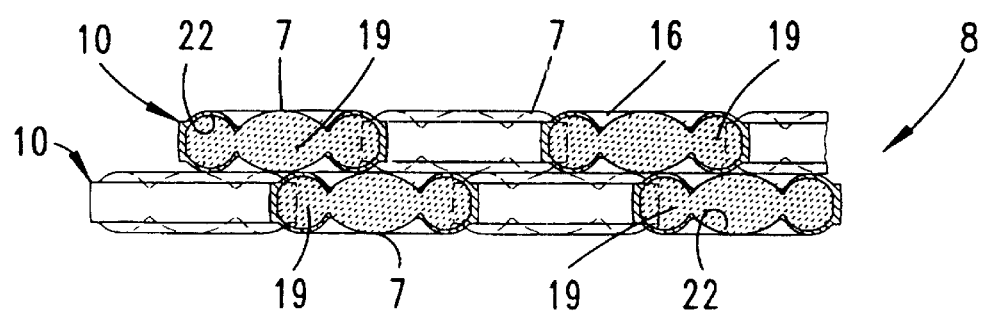
FIG. 15 shows the section along the line XV—XV in FIG. 14, the vehicle tires being injected with concrete.

FIGS. 14 and 15 show an embodiment in which two layers of sheet-like net structures 10 according to FIG. 12 are layered one above the other, the vertical layers being mounted, offset, one above the other. In this case, the injected tire regions do not lie directly one above the other, the result of which is that a rubber layer is also formed in each case horizontally between the individual, preferably injected concrete layers, so that a desired flexibility can be increased even further here.

The two layers, layered one above the other, of sheet-like net structures 10 may, in a further embodiment, also be connected to one another by means of bolts.

In the top view according to FIG. 14, the arrangement is illustrated as still being non-injected. As can be seen from the cross section according to FIG. 15, in this exemplary embodiment a filling mass of concrete 19 fills the vehicle tire 7, including the free tire opening 16.

Figure 16:
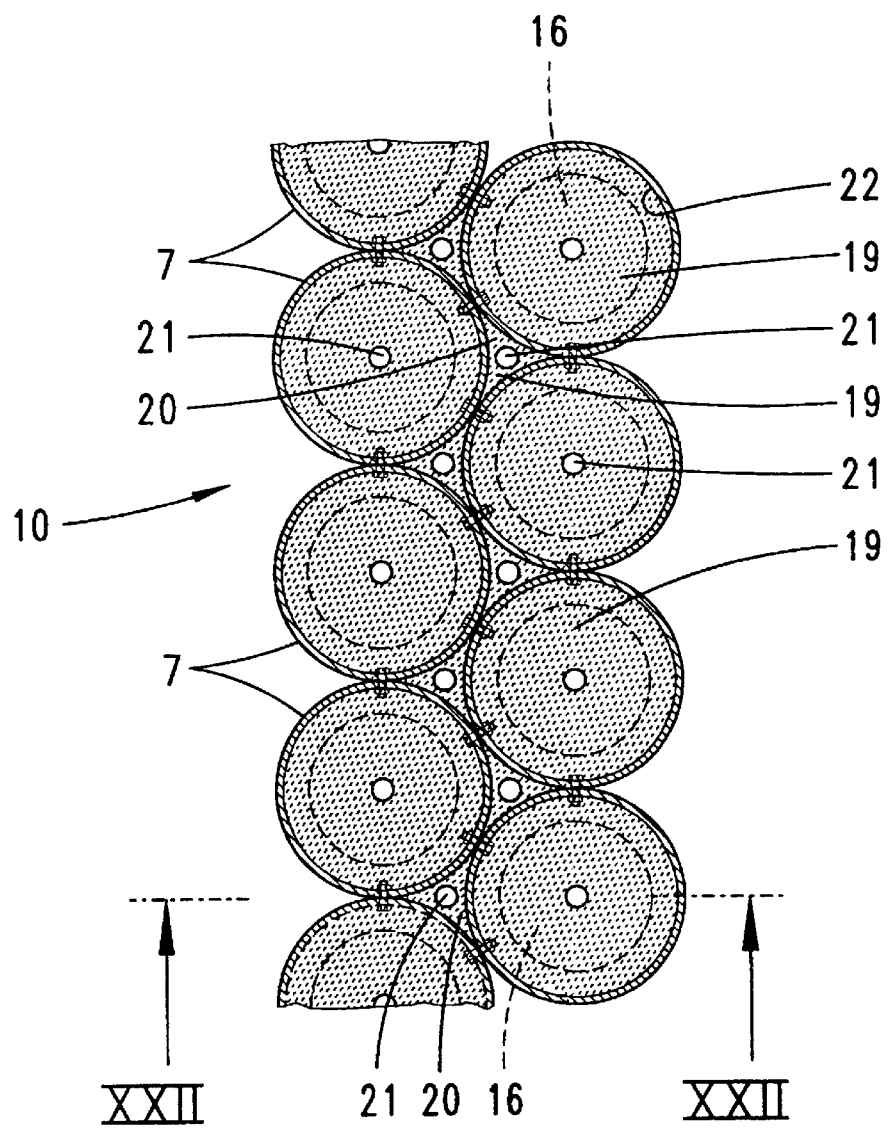
FIG. 16 shows a sectional illustration of a single-layer arrangement of a net structure, in which both the tire inner spaces and the wedge-shaped regions defined between the tires are injected with concrete.
Figure 17:
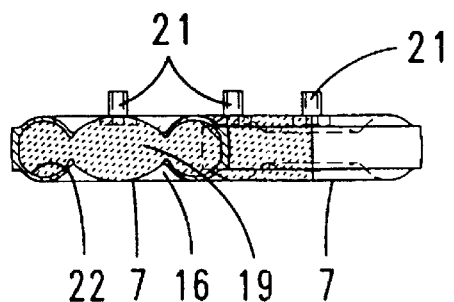
FIG. 17 shows the section along the line XVII—XVII in FIG. 16.

FIG. 16 shows an arrangement, in which, in each case, three vehicle tires 7 touch one another and are connected to one another by press-bolting, so as to form an inherently rigid network. In this case, the vehicle tires 7 are injected with concrete 19 over the entire area in the interior. Furthermore, the wedge-shaped regions 20 arising between the vehicle tires 7 are also filled with concrete 19. For this purpose, a filling nipple 21 for injecting the concrete 19 is associated with each vehicle tire 7 and each wedge-shaped region 20.

Alternatively, according to FIGS. 18 and 19, partial injection of the vehicle tires 7 with concrete 19 may be carried out. In this case, only the tire inner space 22 is filled, a fabric hose 23 serving as a protective sheath being accommodated in this inner space. This annular fabric hose 23 is provided with two inner injection nipples which in each case form filling connections 24, one nipple forming an inlet connection 25 for the supply of injection mass and the other nipple constituting an outlet connection 26 for transferring the injection mass to further fabric-hose bodies. For this purpose, advantageously, the outlet connection 26 of one vehicle tire 7 is connected by way of a connecting hose 27 to the inlet connection 25 of an adjacent vehicle tire 7.

Injection with concrete or else other filling materials is carried out in that, from a concrete pump, a plurality of injection hoses lead to filling nipples 21 according to the embodiment in FIG. 16 or one injection hose 28 leads to an inlet connection 25 of a first fabric hose 23. From here, the fabric hoses 23 of the other vehicle tires 7 are connected in series by means of the connecting hoses 27.

In a further embodiment, the wedge-shaped regions defined between the vehicle tires 7 may also be injected with concrete 19 by means of a fabric hose having a filling connection 24.

For prefixing the fabric hose 23 in the vehicle tire 7 or in its tire inner space 22, the fabric hose 23 possesses internally a spreading ring 29 consisting of any desired material and having a diameter approximately equal to the inside diameter of the vehicle tire 7.

Figure 21:
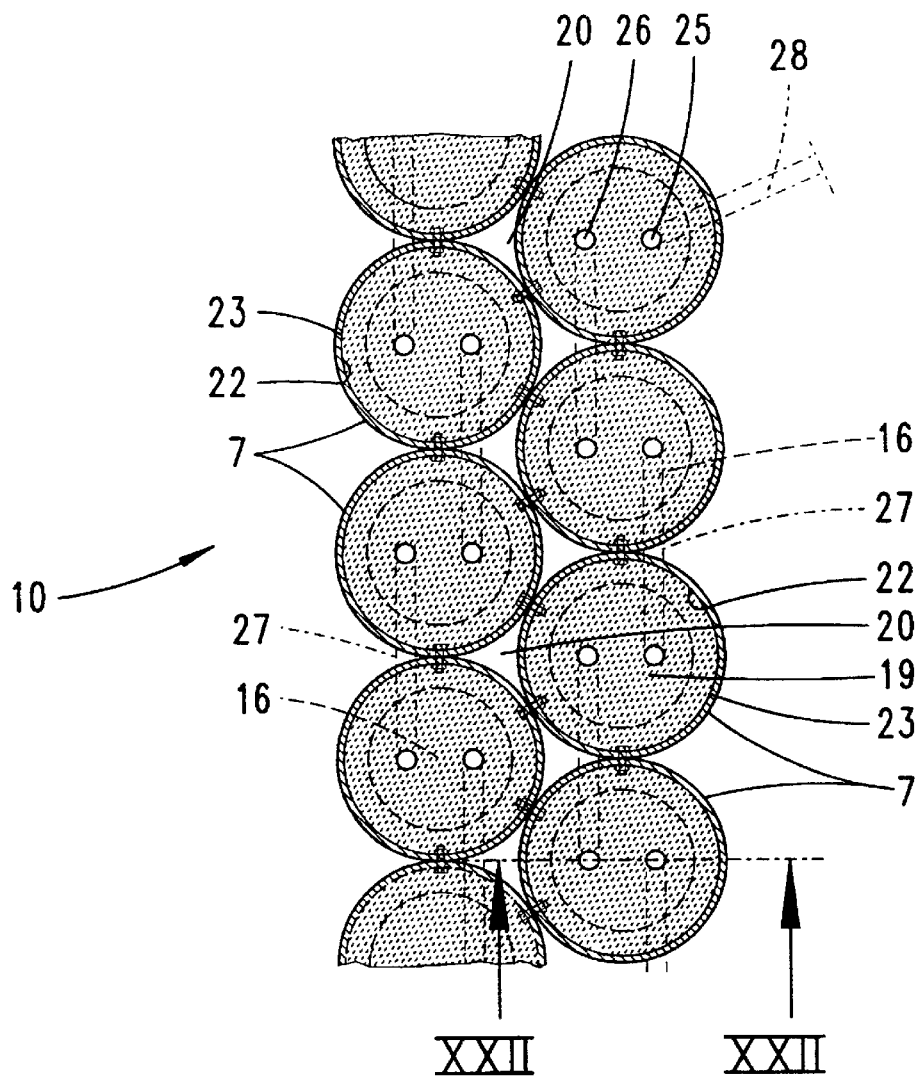
FIG. 21 shows an illustration corresponding to that of FIG. 18, but with the vehicle tire, including the free tire opening, being injected completely with concrete.
Figure 22:
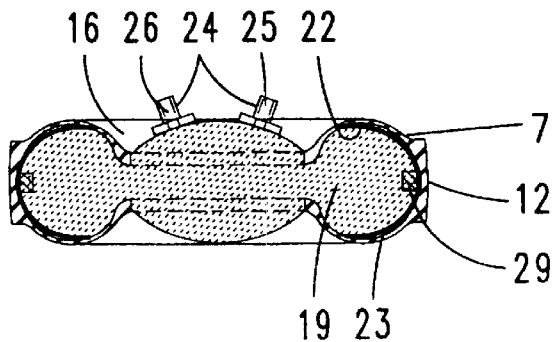
FIG. 22 shows the section along the line XXII—XXII in FIG. 21.

In a further alternative embodiment, complete injection of the vehicle tires 7 may also be envisaged. For this purpose, as illustrated in FIGS. 21 and 22, a substantially round fabric hose 23 is held in the vehicle tire 7 by a spreading ring 29. This fabric hose 23 likewise possesses two filling connections 24. When the fabric hose 23 is filled with concrete, the entire tire diameter is filled in one operation, thus resulting, in the region of the tire opening 16, in a bubble-like bulging of the fabric hose 23 (cf. the sectional illustration in FIG. 22). The fabric hose 23 used here is formed substantially as a double-surface round fabric body, in contrast to the annular fabric hose 23, illustrated in FIG. 20, for filling only the tire inner space 22.

Figure 23:
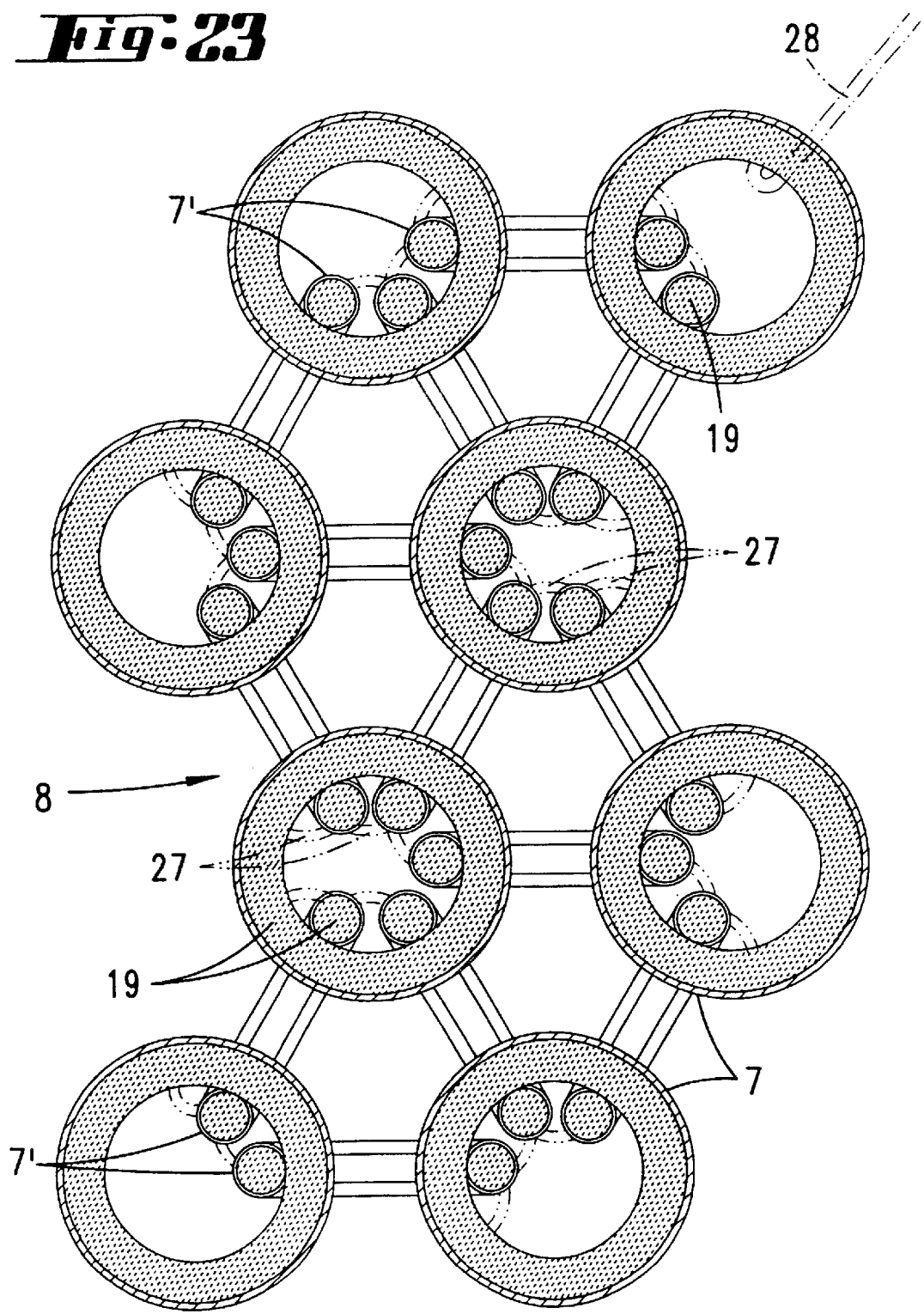
FIG. 23 shows a sectional illustration of a spatial net structure, with a connection of the vehicle tires according to FIG. 4, the tire inner spaces being injected by means of inserted fabric hoses.

FIG. 23 shows an arrangement of vehicle tires 7 which are connected to one another, according to the exemplary embodiment of FIGS. 6 and 7, by means of a third cut-open vehicle tire 71, to form a spatial net structure 8. In a manner corresponding to the exemplary embodiment in FIG. 18, these vehicle tires 7 are provided with fabric hoses 23 which are connected to one another by means of hoses 27 illustrated here by dashes and dots. This arrangement, too, is injected preferably with concrete by way of an injection hose 28, so that the tire inner spaces 22 filled accordingly provide weighting for the entire net structure 8.

Figure 24:
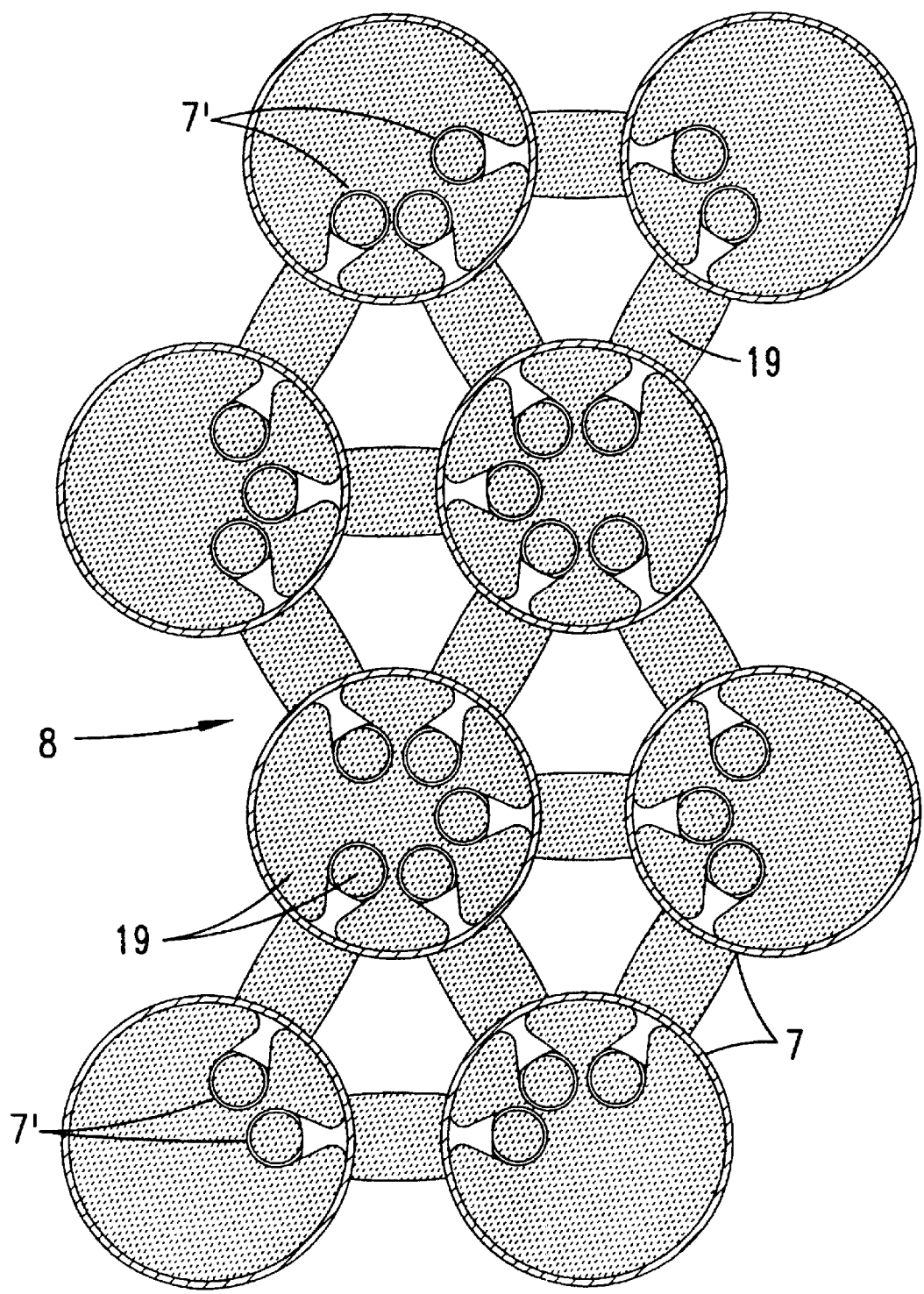
FIG. 24 shows an illustration corresponding to that of FIG. 23, with injection by inserted fabric hoses completed.

In FIG. 24, there is shown in a further embodiment, an arrangement according to FIG. 23, but, here, fabric hoses 23 are used which effect a complete filling of the vehicle tires, that is to say both the tire inner space 22 and the tire opening 16, according to the exemplary embodiment in FIG. 21. Furthermore the wedge-shaped regions 20 between the vehicle tires may also be provided with further fabric hoses 23 which, for injecting purposes, are likewise to be connected via connecting hoses 27 to the fabric hoses 23 inserted in the vehicle tires 7.

Figure 25:
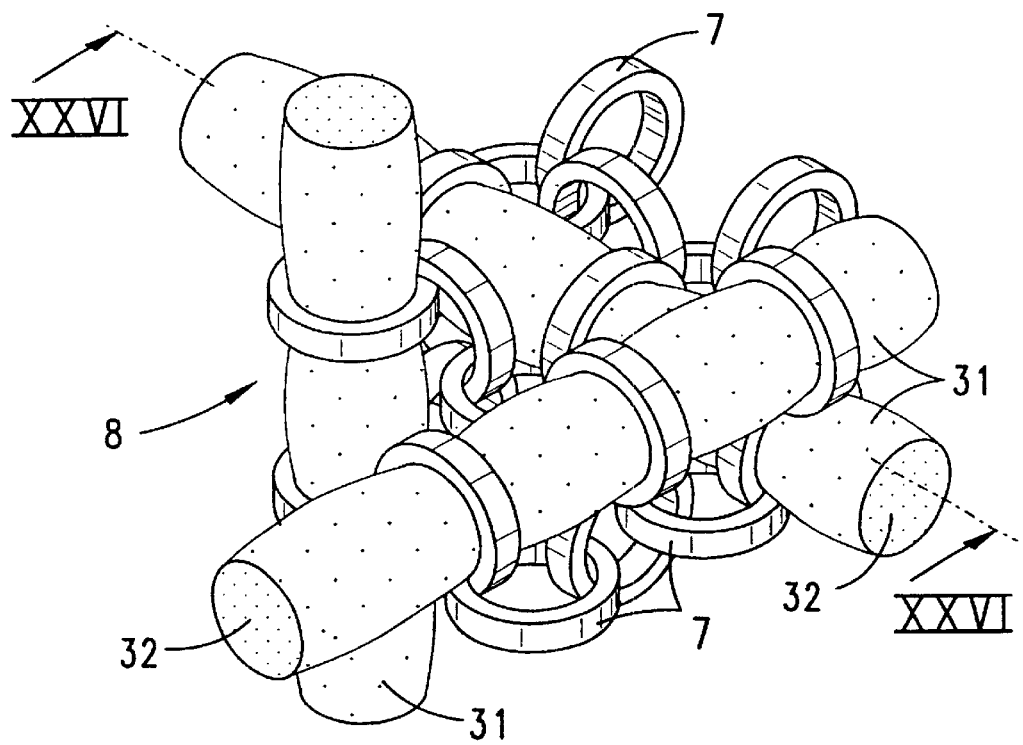
FIG. 25 shows an illustration corresponding to that of FIG. 7, with column-like concrete elements passing through the vehicle tires.

A further embodiment is illustrated in FIG. 25. Here, fabric socks 31, likewise serving as a protective sheath 30, pass through a spatial net structure 8 according to FIG. 7. In this case, the arrangement is so selected that these fabric socks 31 extend substantially along a tire axis. Also these fabric socks 31 are filled with concrete by way of injection hoses 28, not illustrated, so that, after the injection work has been concluded, column-like concrete elements 32 are formed. In FIG. 25, only three fabric socks 31 injected to form concrete elements 32 are illustrated. In practice, however, a multiplicity of fabric socks 31 of this type are inserted, intersection points of the fabric socks 31 being deliberately incorporated. These fabric socks adapt to one another during injection.

Figure 26:
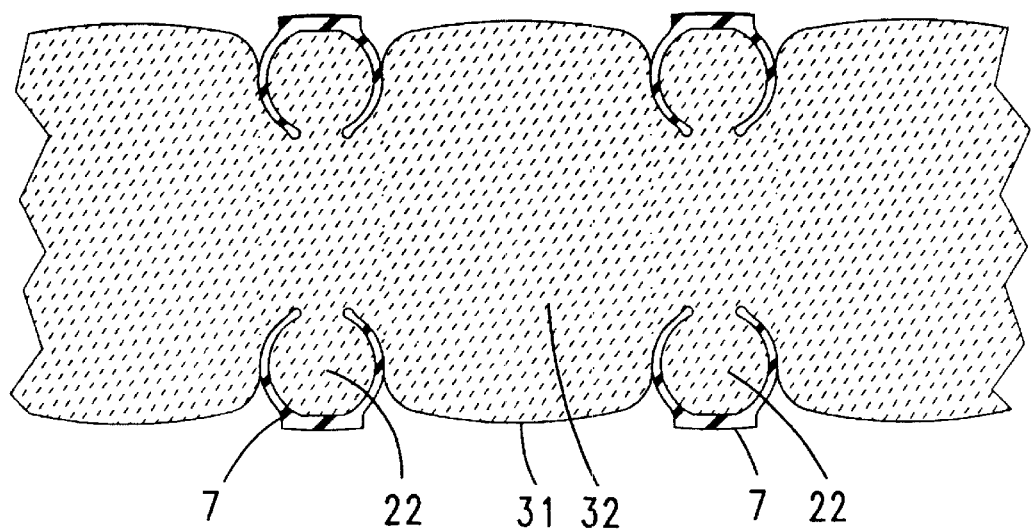
FIG. 26 shows the section along the line XXVI—XXVI in FIG. 25.

The fabric socks 31 embedded in the vehicle tires 7 are functionally mounted in terms of their position in such a way that, in the injected state according to FIG. 25, they expand to such an extent and partly agglomerate in such a way that a positive, non-positive and adhesive agglomeration of vehicle tires 7 and fabric socks 31 or concrete elements 32 altogether is obtained (cf. FIG. 26). In this manner, in conformity with the volumetric dimensions of a further composite tire structure, a substantially monolithic overall body is obtained, the inner vehicle tires acting in the manner of a flexible reinforcement.

There is also the possibility, in an arrangement with fabric socks 31, of additionally using fabric hoses 23 to be injected in the tire inner space 22.

FIG. 27 shows a cross section through a fabric hose 23 with a connecting member 33 which is provided on it and which forms filling connections 24 on the top side and underside of the fabric hose 23. The connecting member 33 shown in this exemplary embodiment may be provided, for example, for central arrangement in a fabric hose 23 serving for the complete injection of a vehicle tire 7.

In the region of the orifices 34 of the fabric hose 23, through which orifices the filling connections 24 pass, the fabric hose is held sealingly at the filling connections 24 by clamping rings 35.

As can be seen in FIG. 27, further filling connections 24 may also be provided in the region of the connecting member 33, such as, for example, a lateral filling connection 24 illustrated by dashes and dots.

Both the connecting member 33 illustrated and the clamping rings 35 may also serve for attachment to rubber or plastics hoses which, provided in the tire inner space 22, may serve as buoyancy bodies.

In FIG. 28, there is shown a sectional illustration of a vehicle tire 7 which serves for forming a net structure according to the invention and in the tire inner space 22 of which there is inserted a buoyancy body 36 in the form of a plastic or rubber hose. In order initially to keep the net structure formed floatable in use under water, for example for dyke reinforcement, the inserted hoses are first filled with air and therefore serve as buoyancy bodies 36. Alternatively, these plastics or rubber hoses may also serve for filling with concrete or the like.

The vehicle tire 7 illustrated in FIG. 29 possesses an axially disposed fabric hose 23 for injection purposes, as already described above.

There may also be a combination of fabric hose 23 and buoyancy body 36 according to FIG. 30. As soon as the buoyancy medium, preferably air, is bled out of the buoyancy bodies 36, injection takes place by way of the fabric hose 23, with the result that the latter also injects the tire inner space 22 previously filled by the buoyancy body 36.

In FIGS. 31 to 33, there are shown various working situations during the production of a net structure to be located under water.

In FIG. 31, the shoreline region is designated by the reference numeral 37, the water surface by 38 and the sea bottom by 39. The vehicle tires 7, not illustrated, lie ready in the shoreline region 37 for production of the net structure 8 which, here, is spatial. Furthermore, in the shoreline region 37, there are also the injection accessories, such as, for example, a compressor.

In order to produce the spatial net structure 8, a floating assembly platform 41 forming a carrying device 40 is provided. The said assembly platform has a working base surface 42, on the underside of which floatation elements 43 are provided. Pontoons or else drums may serve this purpose.

Rolling members 44 arranged with their axes of rotation transverse to a longitudinal extent of the net structure 8 are provided on the working base surface 42. These rolling members may be used steel barrel hoops, through which a scaffolding tube is inserted as a carrying axle. Alternatively, here too, (old) vehicle tires may be used as rolling members 44.

Assembly of the individual vehicle tires 7 in relation to and with one another commences, at the point marked A, on that side of the carrying device 40 which faces the shoreline region 37. In the exemplary embodiment shown, a connection of the tires 7 to one another by means of further vehicle tires 71 is provided. However, any other alternative method of connection, as described above, may also be envisaged. In this case, assembly may take place in the shoreline region 37, after which finished sections are rolled away seawards by way of the carrying device 40. There is, however, also the possibility of producing the net structure 8 directly on the carrying device 40.

During assembly of the vehicle tires, these are provided at the same time with hoses serving as buoyancy bodies 36 and with fabric hoses 23 and/or fabric socks 31. Both the buoyancy hoses and the fabric hoses 23 are at least partially connected to one another by connecting hoses described. In the exemplary embodiment shown, the vehicle tires of the uppermost layer of the three-dimensional net structure 8 are provided with injection hoses 28 which are connected in the shoreline region 37 to the compressor stationed there.

With the lowering of a finished section (see position B in FIG. 31), the net structure 8 is lowered onto the water surface 38 (see C in FIG. 31). The carrying device 40 consequently acts in the manner of a weaving loom. The vehicle tires 7 assembled in each case remain on the water surface 38, where they initially float on the water surface by means of the air-filled buoyancy bodies 36 described.

As may also be seen in FIG. 31, two monitoring hoses 45 are provided which, at one end, are connected to the net structure 8 or to fabric hoses 23/fabric socks 31 and, at the other end, are provided with monitoring socks 50 visible above the water level. The latter are preferably manufactured from a fabric, also preferably from the same material as the fabric hoses/socks.

The state prevailing during the injection of the net structure can be observed by way of these monitoring hoses 45 or monitoring socks 50.

FIG. 32 illustrates diagrammatically a finished net structure 8 floating on the water surface 38. In contrast to the exemplary embodiment described above, here all the vehicle tires 7 are line-interlinked, so that the entire net structure 8 can be injected with concrete or the like by means of only one injection hose 28. A further monitoring line 45 may serve, here, as an indication of completion of injection when injected concrete emerges. Alternatively, this hose may also serve as an additional injection hose.

FIG. 33 shows the position of the net structure 8 in which it has been lowered onto the sea bottom 39, for which purpose the air cushions present in the buoyancy bodies 36 are removed, preferably by remote control. This is carried out, for example, by the opening of a valve or, in the simplest possible way, if the buoyancy bodies 36 are provided in the form of plastics or rubber hoses, by the destruction of these.

The net structure 8, which has then been lowered into its desired position in a controlled manner, can be injected with concrete or the like from the shoreline region 37 by way of the linking injection hoses 38, full-volume injection being checked, even under water, by way of the monitoring socks 50 located above water. By virtue of the flexible construction of the net structure, the latter can adapt to the surface conditions.

Concrete bodies of any desired thickness can be produced by means of this technique, the encasing or internal vehicle tires 7 providing a flexibly acting reinforcement. By means of the controlled injection technique, it is possible, at any desired location and at any depth of water, to produce a trouble-free concrete not contaminated, for example, by sea water, if appropriate injection being carried out from a floating assembly platform 41.

As a result of the method according to the invention, underwater work, such as, for example, the production of new reefs or islands, can easily be carried out from the water surface or from the shoreline region by remote control by way of the injection hoses 28. Commercially available injection nipples and injection hoses are preferably used for this purpose.

Figure 34:
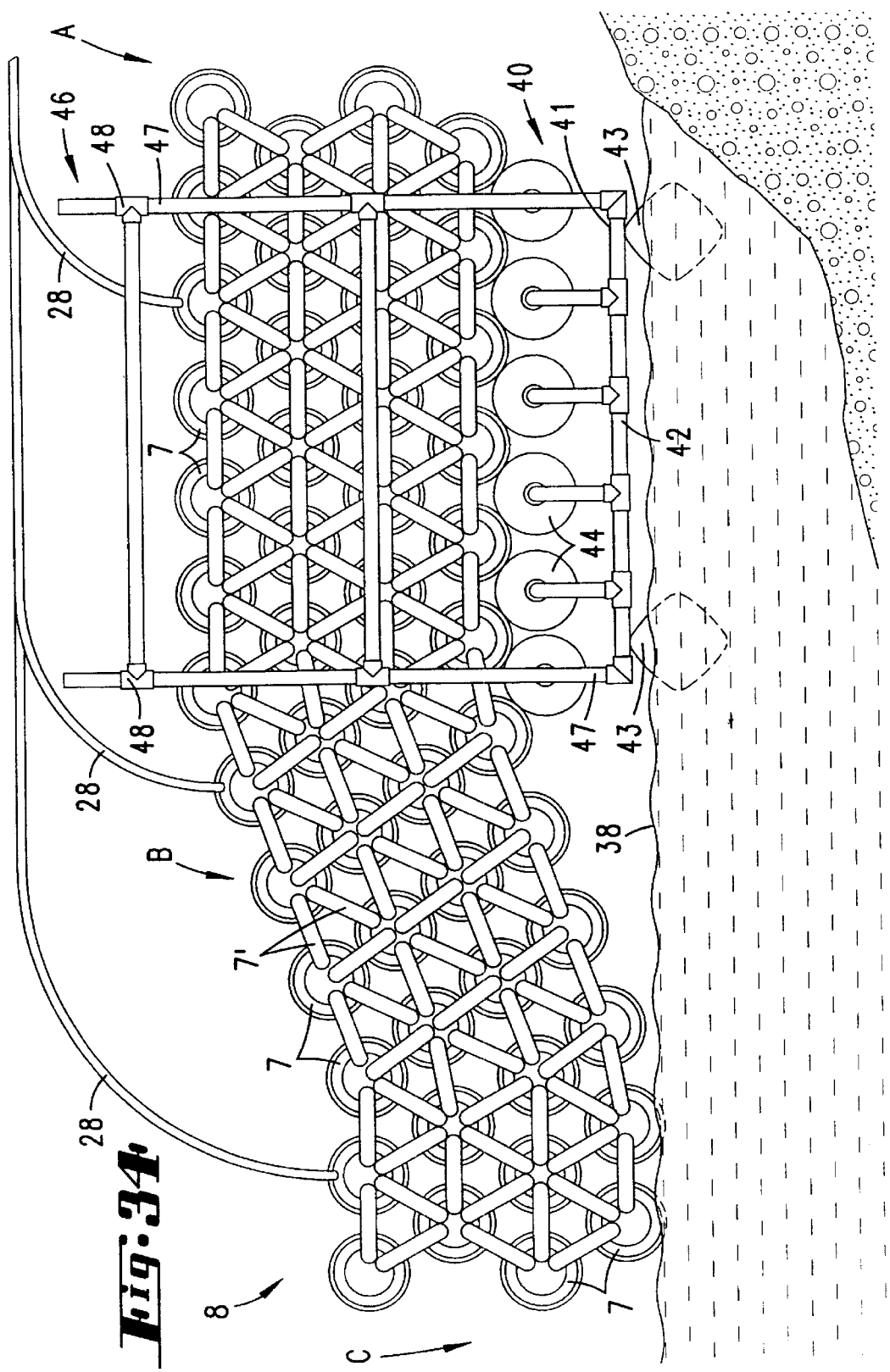
FIG. 34 shows an illustration corresponding to that of FIG. 31, but referring to an alternative construction of the net structure and of the carrying support.

In FIG. 34, there is illustrated the production of a further embodiment of a spatial net structure 8 which has a greater height. For this purpose, four layers, arranged one above the other, of vehicle tires 7 are connected together with further tires to form a three-dimensional flexible structure. The carrying device 40 is provided correspondingly with a scaffolding 46 which is composed of commercially available scaffolding tubes 47 and scaffolding connectors 48.

Finally, a finished construction is illustrated in FIG. 35. Here, the vehicle tires 7 are arranged frustoconically in cross section, in order to form a circular rampart 49. The tire inner spaces 22, the tire openings 16 and also the wedge-shaped regions 20 are provided with fabric hoses 23 and are injected with concrete. In an arrangement as a circular rampart 49, these net structures can be used to construct islands to be erected artificially in regions of shallow water. Furthermore, such circular ramparts 49 are also suitable for knolls on Halligen or other islands and for harbour installations. Moreover, such a lowered tire structure may also serve as a ring atoll or reef.

Alternatively to filling with concrete, it is conceivable, in order to achieve vegetation, for example, under water, to inject substrates, intermixed with the appropriate plant germs or seeds. Furthermore, the clear intermediate spares inside and outside the vehicle tire 7 may be filled with humus or topsoil, this also being the basis for vegetation.

We claim:

1. Method for securing, stabilising and reclaiming areas of land and subsoils above and below water, comprising the steps of
    securing being carried out by means of vehicle tires interconnected preferably in a net-like manner, and
    weighting being accomplished by means of concrete (19), and wherein the concrete (19) is injected in a fabric hose which is accommodated in a tire inner space.

2. Method according to claim 1, wherein the vehicle tires (7), in the first place, are connected to one another in a net-like manner and are then laid onto or introduced to an area of land to be secured.

3. Method according to claim 1, wherein the vehicle tires (7) are filled after they have been laid onto the area of land.

4. Method according to claim 1, wherein the vehicle tires (7) are injected with the concrete (19).

5. Method according to claim 1, the vehicle tires (7) are filled with earth.

6. Method according to claim 1, wherein the net-like connection is provided as a spatial structure of a plurality of layers of the vehicle tires (7).

7. Method according to claim 1, wherein the net structure (8, 10) is constructed on a floatable carrying device (40).

8. Method according to claim 1, wherein the net structure (8,10) is constructed continuously, with a finished section being lowered onto a water surface (38).

9. Method according to claim 1, wherein the net structure (8, 10) is equipped with buoyancy bodies (36).

10. Method according to claim 1, wherein the injecting with concrete (19) is carried out under water after laying on an area of land (39).

11. Method according to claim 1, wherein a connection of injection hoses (28) is also carried out while the net structure (6, 10) is being constructed.

12. Method according to claim 1, wherein a completion of injecting above and below water is monitored by a monitoring hose (45).

13. Dyke (1) with an outer slope (3) and an inner slope (2), at least one of the outer slope (3) or the inner slope (2) being secured by vehicle tires (7) which lie thereon and are connected to one another to form a net structure (8, 10), wherein concrete injected in a fabric hose is contained in a vehicle tire inner space.

14. Dyke according to claim, 13, wherein the net structure (8) is multi-layered.

15. Dyke according to claim 13, wherein the net structure (8, 10) tapers in a stepped manner towards dyke top (9).

16. Dyke according to claim 13, wherein the net structure (8, 10) extends over and beyond the slope (2, 3) into the land in front.

17. Net structure (8, 10) of vehicle tires (7), in particular for use in a method and for forming a dyke (1) according to claim 13, wherein the net structure (8, 10) is weighted by means of the concrete (19) injected in a protective sheath (30) formed as the fabric hose.

18. Net structure according to claim 17, wherein the protective sheath (30) is water-impermeable.

19. Net structure according to claim 17, wherein concrete element (32) injected in the protective sheath (30) passes through the vehicle tire (7) in axial direction.

20. Net structure according to claim 17, wherein concrete elements (32) are in a non-positive or positive bond with the vehicle tires (7) by injection.

21. Net structure according to claim 17, wherein two vehicle tires (7) are bolted to one another by penetration through treads (12).

22. Net structure according to claim 17, wherein two of said vehicle tires (7) are connected to one another by means of a loop.

23. Net structure according to claim 17, wherein one vehicle tire (7') connects two further vehicle tires (7) to one another in a loop-like manner.

24. Net structure according to claim 23, wherein a connecting vehicle tire (7') or the connected vehicle tires (7) are severed and are reconnected to one another.

25. Net structure according to claim 24, wherein the severed vehicle tires (7) have a substantially radially directed severing cut (15) and are reconnected to one another so as to overlap at the severing point.

26. Net structure according to claim 17, wherein one of the vehicle tires (7) is connected to at least two further vehicle tires (7).

27. Net structure according to claim 17, wherein one vehicle tire (7) is filled with a filling mass.

28. Net structure according to claim 27, wherein the filling mass is concrete (19).

29. Net structure according to claim 27, wherein the filling mass is a substrate intermixed with at least one of plant germs or plant seeds.

30. Net structure according to claim 17, wherein the concrete (19) fills the tire inner space (22).

31. Net structure according to claim 17, wherein the concrete (19) fills the vehicle tire (7) completely, including free tire opening (16).

32. Net structure according to claim 17, wherein a fabric hose (23) injected with the concrete (19) is accommodated in the vehicle tire (7), the hose filling the entire tire diameter.

33. Net structure according to claim 17, wherein the fabric hose (23) has a filling connection (24).

34. Net structure according to claim 17, wherein the fabric hose (23) has two filling connections (24) as inlet and outlet connections (25, 26).

35. Net structure according to claim 34, wherein a monitoring hose (45) is attached to a filling connection (24).

36. Net structure according to claim 35, wherein a monitoring sock (50) injected with concrete (19) is provided on the monitoring hose (45).

37. Net structure according to claim 17, further comprising wedge-shaped regions (20) arising when vehicle tires (7) laid against one another flat are filled with concrete (19).

38. Net structure according to claim 37, wherein the wedge-shaped regions (20) are injected with the concrete through a fabric hose (23) having a filling connection (24).

39. Net structure according to claim 17, wherein a spreading ring (29) is provided in the fabric hose (23).

40. Assembly platform for constructing a tire net structure on water (41), in particular a net structure (8, 10) according to claim 17, further comprising rolling members (44) arranged with their axes of rotation transverse to a longitudinal extent of the net structure (8, 10).

41. Assembly platform according to claim 40, wherein the rolling members (44) form a working base surface (42) for the assembly platform (41).

42. Assembly platform according to claim 40, wherein the assembly platform (41) has on its underside floatation elements (43).

43. Assembly platform according claim 40, wherein the rolling members (44) are formed from vehicle tires.

* * * * *